US010574647B2

(12) United States Patent
Ogawa

(10) Patent No.: US 10,574,647 B2
(45) Date of Patent: Feb. 25, 2020

(54) USER AUTHENTICATION METHOD AND SYSTEM FOR IMPLEMENTING SAME

(71) Applicant: Passlogy Co., Ltd., Tokyo (JP)

(72) Inventor: Hideharu Ogawa, Tokyo (JP)

(73) Assignee: Passlogy Co., Ltd., Tokyo (JP)

( * ) Notice: Subject to any disclaimer, the term of this patent is extended or adjusted under 35 U.S.C. 154(b) by 175 days.

(21) Appl. No.: 15/507,016

(22) PCT Filed: Aug. 31, 2015

(86) PCT No.: PCT/JP2015/074761
§ 371 (c)(1),
(2) Date: Feb. 27, 2017

(87) PCT Pub. No.: WO2016/035769
PCT Pub. Date: Mar. 10, 2016

(65) Prior Publication Data
US 2017/0257359 A1    Sep. 7, 2017

(30) Foreign Application Priority Data

Sep. 1, 2014 (JP) .................................. 2014-176784

(51) Int. Cl.
*H04L 29/06* (2006.01)
*G06F 16/951* (2019.01)
(Continued)

(52) U.S. Cl.
CPC .......... *H04L 63/083* (2013.01); *G06F 16/951* (2019.01); *G06F 21/30* (2013.01); *H04L 9/3226* (2013.01); *H04L 63/0853* (2013.01)

(58) Field of Classification Search
CPC .... G06F 21/62; G06F 21/6209; G06F 21/123; G06F 21/34; G06F 21/44; G06F 21/30;
(Continued)

(56) References Cited

U.S. PATENT DOCUMENTS 6,199,113 B1 *  3/2001  Alegre ................... G06F 21/31
                                                    709/219
6,205,479 B1 *  3/2001  Dulai ...................... H04L 63/10
                                                    709/203
(Continued)

FOREIGN PATENT DOCUMENTS

JP      S61-103274 A      5/1986
JP      2008-197710 A     8/2008
(Continued)

OTHER PUBLICATIONS

International Search Report issued in PCT/JP2015/074761; dated Nov. 17, 2015.
(Continued)

*Primary Examiner* — Saleh Najjar
*Assistant Examiner* — Khalid M Almaghayreh
(74) *Attorney, Agent, or Firm* — Studebaker & Brackett PC

(57) ABSTRACT

A new user authentication method which prevents illicit access to a system includes an authentication system which authenticates a user. The authentication system includes a database which manages user account information including a token ID which identifies a security token; a synchronization server which generates token codes on the basis of the token ID; and an authentication server which carries out an authentication determination transmitted from the system, and transmits the result to the system subject to use. If a prior notification of an authentication request is received prior to receiving the user authentication request, the authentication server carries out the authentication determination using a first token code. Alternatively, if the user authentication request is received without prior notification of the authentication request being received, the authentication server
(Continued)

carries out the authentication determination using the first token code and a second token code.

13 Claims, 23 Drawing Sheets

(51) Int. Cl.
*G06F 21/30* (2013.01)
*H04L 9/32* (2006.01)

(58) Field of Classification Search
CPC ........ G06F 21/31; G06F 21/45; G06F 21/445; H04L 63/08; H04L 63/10; H04L 63/083; H04L 63/0807; H04L 9/3226; H04L 9/3263; H04L 9/3213
USPC .................. 726/2, 4–7, 9–10, 17–21, 27–29; 713/150, 185
See application file for complete search history.

(56) References Cited

U.S. PATENT DOCUMENTS

| | | | | |
|---|---|---|---|---|
| 6,484,174 | B1* | 11/2002 | Wall | G06F 21/31 |
| 6,615,264 | B1* | 9/2003 | Stoltz | G06F 21/31 |
| | | | | 709/225 |
| 8,140,854 | B2 | 3/2012 | Ogawa | |
| 8,312,538 | B2 | 11/2012 | Ogawa | |
| 8,527,758 | B2* | 9/2013 | Mansour | H04L 9/3218 |
| | | | | 380/28 |
| 8,925,053 | B1* | 12/2014 | Mehta | G06F 21/31 |
| | | | | 713/155 |
| 8,925,058 | B1* | 12/2014 | Dotan | G06F 21/31 |
| | | | | 713/186 |
| 9,319,393 | B2* | 4/2016 | Hillis | H04L 63/0853 |
| 9,419,969 | B2* | 8/2016 | Polo Moragon | H04L 63/0853 |
| 10,091,180 | B1* | 10/2018 | Moritz | H04L 63/102 |
| 2003/0105966 | A1* | 6/2003 | Pu | G06F 21/31 |
| | | | | 713/186 |
| 2005/0010786 | A1* | 1/2005 | Michener | G06F 21/34 |
| | | | | 713/185 |
| 2008/0072301 | A1* | 3/2008 | Chia | G06F 21/41 |
| | | | | 726/8 |
| 2008/0271126 | A1* | 10/2008 | Saraf | H04L 63/0815 |
| | | | | 726/5 |
| 2008/0298588 | A1* | 12/2008 | Shakkarwar | G06Q 20/02 |
| | | | | 380/255 |
| 2011/0173684 | A1* | 7/2011 | Hurry | G06Q 20/3552 |
| | | | | 726/6 |
| 2011/0191592 | A1* | 8/2011 | Goertzen | G06F 21/36 |
| | | | | 713/182 |
| 2012/0079288 | A1* | 3/2012 | Hars | G06F 21/00 |
| | | | | 713/193 |
| 2012/0204245 | A1* | 8/2012 | Ting | G06F 21/35 |
| | | | | 726/6 |
| 2013/0007845 | A1* | 1/2013 | Chang | G06F 21/62 |
| | | | | 726/4 |
| 2013/0145435 | A1* | 6/2013 | Fu | G06F 21/6218 |
| | | | | 726/4 |
| 2013/0347071 | A1* | 12/2013 | Polo Moragon | H04L 63/0853 |
| | | | | 726/3 |
| 2014/0019757 | A1* | 1/2014 | Mehtala | G06F 21/33 |
| | | | | 713/168 |
| 2014/0189808 | A1* | 7/2014 | Mahaffey | H04L 63/083 |
| | | | | 726/4 |
| 2015/0033306 | A1* | 1/2015 | Dickenson | G06F 21/31 |
| | | | | 726/7 |
| 2015/0089607 | A1* | 3/2015 | Hubner | H04L 63/0838 |
| | | | | 726/6 |

FOREIGN PATENT DOCUMENTS

| | | | |
|---|---|---|---|
| JP | 2008197710 A | * | 8/2008 |
| JP | 2010-146400 A | | 7/2010 |
| JP | 4663676 B2 | | 4/2011 |
| JP | 2011-238162 A | | 11/2011 |
| JP | 2011238162 A | * | 11/2011 |
| WO | 2003/069490 A1 | | 8/2003 |
| WO | 2007/026486 A1 | | 3/2007 |
| WO | 2011/037226 A1 | | 3/2011 |
| WO | WO-2011037226 A1 | * | 3/2011 ............ H04L 63/08 |
| WO | WO-2014180431 A1 | * | 11/2014 |

OTHER PUBLICATIONS

George Coulouris et al.; Translated by Tadanori Mizuno et al.; Distributed Systems—Concept and Design, 2nd Revision; Japan, Denki-Shoin Co.; Oct. 31, 1997; 2nd Revision, 1st Printing; pp. 864-876.

An Office Action; "Notification of Reasons for Refusal," issued by the Japanese Patent Office dated Mar. 19, 2018, which corresponds to Japanese Patent Application No. 2017-101697 and is related to U.S. Appl. No. 15/507,016.

Daizu Onishi & Associates IT Chosa Kaigi; "Best IT Shijo Consulting Jirei kara Manabu IT Keyword Profiling vol. 7"; IT Select; Feb. 1, 2002; pp. 56-61 ; vol. 2, No. 2.

An Office Action; "Notice of Reasons for Rejection," issued by the Japanese Patent Office dated Dec. 20, 2016, which corresponds to Japanese Patent Application No. 2016-544631 and is related to U.S. Appl. No. 15/507,016.

An Office Action; "Final Reason for Rejection," issued by the Japanese Patent Office dated Feb. 24, 2017, which corresponds to Japanese Patent Application No. 2016-544631 and is related to U.S. Appl. No. 15/507,016.

* cited by examiner (a)

ENTER YOUR USER NAME

USER NAME [ ogawa ] ~ 901

ENTER NUMERALS YOU EXTRACTED IN ACCORDANCE WITH YOUR PASSWORD DERIVATION PATTERN

PASSWORD [ **** ] ~ 902

ADDITIONAL CODE [ ] ~ 903

[ LOGIN ]   [ CANCEL ]

(a)

ENTER YOUR USER NAME

USER NAME [ ogawa ] ~ 901

ENTER NUMERALS YOU EXTRACTED IN ACCORDANCE WITH YOUR PASSWORD DERIVATION PATTERN

PASSWORD [ **** ] ~ 902

[ LOGIN ]   [ CANCEL ]

(b)

USER AUTHENTICATION METHOD AND SYSTEM FOR IMPLEMENTING SAME

TECHNICAL FIELD

The present invention relates to computer security, and more particularly to a method of authenticating a user of a computer system, and a system for implementing this method.

BACKGROUND ART

Computer security is extremely important technology for protecting a computer system from illicit use by a third party with malicious intent. A simple example of user authentication for preventing illicit access to a computer system is a method using a user ID and a password that have been registered in an authentication server in advance. With regard to user authentication, various methods have been proposed in accordance with a required security level and a user environment.

Challenge and response authentication is a technique for preventing a password or the like from being stolen during communication by implementing special processing on a character string used for user authentication. This authentication technique is typically employed in an environment such as the Internet, where user authentication must be performed using a communication path on which safety is not guaranteed.

In the challenge and response authentication, first, a client wishing to receive authentication transmits an authentication request to a server, whereupon the server transmits a random string of numerical values (known as a "challenge"), for example, in response thereto. The client creates a string of numerical values known as a "response" by synthesizing a password input by a user with the challenge in accordance with a random number table, for example, and transmits the response to the server. On the server side, a response is created in the same manner from the transmitted challenge and the password of the user, which has been registered in advance, and the created response is compared with the transmitted response. When the responses match, this means that the password is correct, and authentication is completed successfully.

Patent Document 1 discloses a user authentication system serving as a further development of challenge and response authentication, in which a geometric pattern from which a password (referred to as a "password derivation pattern" or a "password extraction pattern") is derived is used instead of the password itself. More specifically, Patent Document 1 discloses a user authentication method and a user authentication system in which a password derivation pattern is registered in advance in an authentication server for each user, the authentication server generates a presentation pattern and presents the presentation pattern to the user when the user uses the system, thereby allowing the user to input, in regard to the presentation pattern, a password corresponding to the password derivation pattern of the user, the authentication server authenticates the input password based on the presented presentation pattern and the registered password derivation pattern of the user, and a usage target system is notified of the authentication result. In Patent Document 1, an information communication terminal owned by the user is used to present the presentation pattern.

Further, Patent Document 2 discloses a site confirmation method with which a user can easily confirm whether or not a server (or a site) accessed by the user is legitimate. More specifically, Patent Document 2 discloses a site confirmation method including a first display step in which a first server displays predetermined confirmation information on a first information terminal device when a user accesses a first server for managing a site from the first information terminal device, and a second display step in which a second server displays the predetermined confirmation information on a second information terminal device when the user accesses the second server from the second information terminal device. Patent Document 2 also discloses a confirmation method in which a security token (a hardware token) is used in place of the second server and the second information terminal device.

CITATION LIST

Patent Documents

Patent Document 1: WO2003/069490
Patent Document 2: WO2007/026486

SUMMARY

Technical Problem

Leakage (theft) of a password used during user authentication causes extremely serious security problems. It is therefore extremely important for users to manage their passwords, and as a basis for ensuring that security problems do not occur in a system, each individual user must take "responsibility" for his/her own behavior.

A password used for user authentication is typically required for each usage target system. Moreover, passwords may be written in various ways (e.g., various characters, numbers of characters, and so on may be used). Therefore, a user who uses a large number of systems must manage a correspondingly large number of passwords, and management of the passwords places a certain burden on the user. Under normal circumstances, the user is expected to make an effort to store his/her passwords in memory, but in a case where a large number of passwords are managed, the user often ends up writing the passwords in a notebook or the like. Moreover, it is a fact that a user who finds password management troublesome may easily set easily remembered numerals, such as his/her own birthday, for example, as a password, or set the same numerals as the password for every system so that the passwords can be managed together.

However, when the user behaves in such a manner with respect to password management, the systems may be exposed to security risks, and as long as users behave in this manner, fundamental security problems will continue to exist with regard to conventional user authentication using a simple password.

Even when the user manages his/her passwords with meticulous care, security problems still exist in that a password input into a terminal device disposed in a store, for example, may be stolen by sight, or a "theft" mechanism may be installed in the terminal device itself and used to leak passwords to a third party.

Furthermore, when user authentication is performed using a random number table, the user may lose the random number table or the random number table may be stolen, and when a third party obtains the random number table, the security level falls to a level no better than that achieved by traditional user authentication. Hence, with this type of user authentication, it is difficult to prevent illicit access to a system effectively. This point applies likewise to user authentication using a security token.

Moreover, in user authentication methods using a portable information communication terminal such as a feature phone or a smartphone, the information communication terminal may be unusable depending on communication conditions on the network in which the user is located, making effective user authentication impossible.

Therefore, to solve the problems described above, an object of the present invention is to provide a novel user authentication method for effectively preventing a third party from accessing a system illicitly, and a system for implementing this method.

Another object of the present invention is to provide a user authentication method and system that make maximum use of existing system infrastructure so that an excessive cost burden is not imposed.

Another object of the present invention is to provide a user authentication method and system that effectively prevent illicit access to a system while ensuring that users can manage passwords easily so that any user can use the method and system easily, thereby eliminating fundamental security problems caused by the behavior of users.

More specifically, an object of the present invention is to provide a user authentication method that applies the concept of a user authentication method using a password derivation pattern while further improving the security effect thereof, and a system for implementing this method.

A further object of the present invention is to provide a user authentication method that is based on a user authentication method using a security token while further improving the security effect thereof, and a system for implementing this method.

A further object of the present invention is to provide a user authentication method and system that can switch selectively to an appropriate user authentication procedure in accordance with communication conditions on a network in which the user is located.

Solution to Problem

To solve the problems described above, the present invention may be configured to include the invention-specifying matter and technical features described below.

The present invention according to one aspect may be an authentication system for authenticating, by way of using an information communication terminal, a user who uses a usage target system. The authentication system may include: an authentication database that manages user account information for each user, the user account information including a token ID for identifying a security token of the corresponding user; a synchronization server that generates at least one token code based on the token ID included in the user account information; and an authentication server that receives a user authentication request transmitted from the usage target system, performs an authentication determination on the user authentication request, and transmits an authentication determination result to the usage target system.

If the authentication server receives an authentication request prior notification, which is transmitted while the information communication terminal is in a communicative condition, before receiving the user authentication request, the authentication server may perform the authentication determination on the user authentication request based on at least a first token code. If the authentication server receives the user authentication request without receiving the authentication request prior notification, the authentication server may perform the authentication determination on the user authentication request based on a set of at least the first token code and a second token code.

If the user authentication request includes a password and an additional code, the authentication server may perform the authentication determination on the user authentication request by comparing a set of the password and the additional code with the set of the first token code and the second token code.

Further, if the authentication server receives the authentication request prior notification from the information communication terminal of a user, the authentication server may perform control to set an authentication request flag associated with the user at a value indicating that the authentication request flag is enabled. If the value of the authentication request flag indicates that the authentication request flag is enabled, the authentication server may perform the authentication determination on the user authentication request by comparing a password included in the user authentication request with the first token code.

Furthermore, the authentication server may reset the value of the authentication request flag to a value indicating that the authentication request flag is disabled when a predetermined time elapses following reception of the authentication request prior notification.

Moreover, if the user authentication request does not include an additional code and the value of the authentication request flag indicates that the authentication request flag is disabled, the authentication server may transmit an authentication determination result indicating that the user authentication request is not permitted to the usage target system.

The authentication server may further perform control to register the authentication determination result in the authentication database as authentication history information.

The present invention according to another aspect may be an information communication terminal used in authentication by an authentication system that authenticates a user who uses a usage target system. The information communication terminal may include: storing means for storing a password derivation pattern constituted by specific elements selected from a group of elements forming a geometric pattern; transmitting means for transmitting an authentication request prior notification to the authentication system; obtaining means for obtaining at least one token code that is in synchronization with the at least one token code generated by the authentication system from a security token of the user; first generating means for generating a code table by assigning a first token code obtained by the obtaining means to the specific elements forming the password derivation pattern within the geometric pattern, and assigning an arbitrary code to remaining elements of the geometric pattern; second generating means for generating an additional code based on a second token code obtained by the obtaining means; and displaying means for displaying a reference screen on a user interface.

If the information communication terminal is in a communicative condition, the transmitting means may transmit the authentication request prior notification to the authentication system and the displaying means may display the reference screen on the user interface so as to include the code table generated by the first generating means, whereas if the information communication terminal is in a non-communicative condition, the displaying means may display the reference screen on the user interface so as to include the code table generated by the first generating means and the additional code generated by the second generating means.

Further, if the information communication terminal is in the communicative condition, the displaying means may display the reference screen on the user interface so as also to include the additional code generated by the second generating means.

The present invention according to a further aspect may be an information communication terminal configured to include a control module having a CPU and a memory, and a communication module. The control module may store a password derivation pattern constituted by specific elements selected from a plurality of elements forming a geometric pattern. The control module may determine whether or not communication by the communication module is possible, and having determined that communication is available, transmit an authentication request prior notification to an authentication system. Further, the control module may obtain at least one token code which is in synchronization with the at least one token code generated by the authentication system from a security token of a user, generate a code table by assigning a first token code obtained from the security token to the specific elements forming the password derivation pattern within the geometric pattern and assigning an arbitrary code to remaining elements of the geometric pattern, or generate in addition thereto an additional code based on a second token code obtained from the security token, and display a reference screen including the code table or both the code table and the additional code on a user interface.

The present invention according to another aspect may be an authentication system for authenticating, by way of using an information communication terminal, a user who uses a usage target system. The authentication system may include: an authentication database that manages user account information for each user, the user account information including a token ID for identifying a security token of the corresponding user; a synchronization server that generates at least one token code based on the token ID included in the user account information; a prior authentication server that receives an authentication request prior notification transmitted from the information communication terminal of a user, and manages a prior notification condition of the user based on the authentication request prior notification; and an authentication server which, upon reception of a user authentication request transmitted from the usage target system, performs an authentication determination on the user authentication request in accordance with an authentication request state of the user, which is managed by the prior authentication server, and transmits an authentication determination result to the usage target system.

If the prior notification condition of the user is active, the authentication server may perform the authentication determination on the user authentication request based on a first token code, whereas, if the user authentication request is received while the prior notification condition of the user is inactive, the authentication server may perform the authentication determination on the user authentication request based on a set of the first token code and a second token code.

In the present invention according to another aspect, an authentication system may include: an authentication database that manages user account information for each user, the user account information including a token ID for identifying a security token of the corresponding user; a synchronization server that generates at least one token code based on the token ID included in the user account information; a prior authentication server that receives an authentication request prior notification transmitted from the information communication terminal of a user, and manages a prior notification condition of the user based on the authentication request prior notification; and an authentication server which, upon reception of a user authentication request transmitted from the usage target system, performs an authentication determination on the user authentication request based on the at least one token code, and transmits an authentication determination result to the usage target system, and the authentication server may perform control to register the authentication determination result in the authentication database as authentication history information.

If the authentication history information relating to a first user authentication request transmitted from a first usage target system indicates successful authentication, the authentication server may perform the authentication determination on a second user authentication request transmitted from a second usage target system.

The present invention may also be understood as an invention directed to a method. More specifically, the present invention according to one aspect may be a user authentication method executed in an authentication system in order to authenticate a user who uses a usage target system. The user authentication method may include: managing user account information for each user, the user account information including a token ID for identifying a security token of the corresponding user; generating at least one token code based on the token ID included in the user account information; receiving a user authentication request transmitted from the usage target system and performing an authentication determination on the user authentication request; and transmitting an authentication determination result to the usage target system. The performing authentication determination may include, if an authentication request prior notification transmitted while an information communication terminal of the user is in a communicative condition is received before receiving the user authentication request, performing authentication determination on the user authentication request based on a first token code, whereas, if the user authentication request is received without receiving the authentication request prior notification, performing authentication determination on the user authentication request based on a set of the first token code and a second token code.

The present invention may also be understood as an invention directed to a computer program or a recording medium on which the program is recorded. More specifically, the present invention according to one aspect may be a program for authenticating, by an authentication system, a user who uses a usage target system. The program may be executed under control of a processor of an information communication terminal, thereby causing the information communication terminal to implement: storing means for storing a password derivation pattern constituted by specific elements selected from a plurality of elements forming a geometric pattern; transmitting means for transmitting an authentication request prior notification to the authentication system; obtaining means for obtaining at least one token code that is in synchronization with the at least one token code generated by the authentication system from a security token of the user; first generating means for generating a code table by assigning a first token code obtained by the obtaining means to the specific elements forming the password derivation pattern within the geometric pattern, and assigning an arbitrary code to remaining elements of the geometric pattern; second generating means for generating an additional code based on a second token code obtained by the obtaining means; displaying means for displaying a reference screen on a user interface; and control means for implementing control such that in a communicative condition, the transmitting means transmits the authentication request prior notification to the authentication system and the displaying means displays the reference screen on the user interface so as to include the code table generated by the first generating means, and implementing control such that in a non-communicative condition, the displaying means displays the reference screen on the user interface so as to include the code table generated by the first generating means and the additional code generated by the second generating means.

It is noted that in the present description and so on, the term "means" does not denote only physical means, and includes a case in which a function of the means is implemented by software. In addition, the function of one means may be implemented by two or more physical means, and the functions of two or more means may be implemented by one physical means.

Advantageous Effects of Invention

According to the present invention, a novel user authentication method that effectively prevents a third party from accessing a system illicitly and a system for implementing this method are provided. Further, according to the present invention, a user authentication method and system that make maximum use of existing system infrastructure so that an excessive cost burden is not imposed are provided. Moreover, according to the present invention, a user authentication method and system that effectively prevent illicit access to a system while ensuring that users can manage passwords easily so that any user can use the method and system easily, thereby eliminating fundamental security problems caused by the behavior of users, are provided.

In particular, according to the present invention, user authentication can be carried out by implementing user authentication procedures that are switched selectively in accordance with communication conditions on a network in which the user is located.

Other technical features, objects, actions and effects, and advantages of the present invention will become apparent from the following embodiments described with reference to the attached drawings.

BRIEF DESCRIPTION OF DRAWINGS

FIG. 9 is a view showing an example of a login screen displayed on a user interface of a usage target system in a user authentication method according to an embodiment of the present invention.

DESCRIPTION OF EMBODIMENTS

Figure 1:
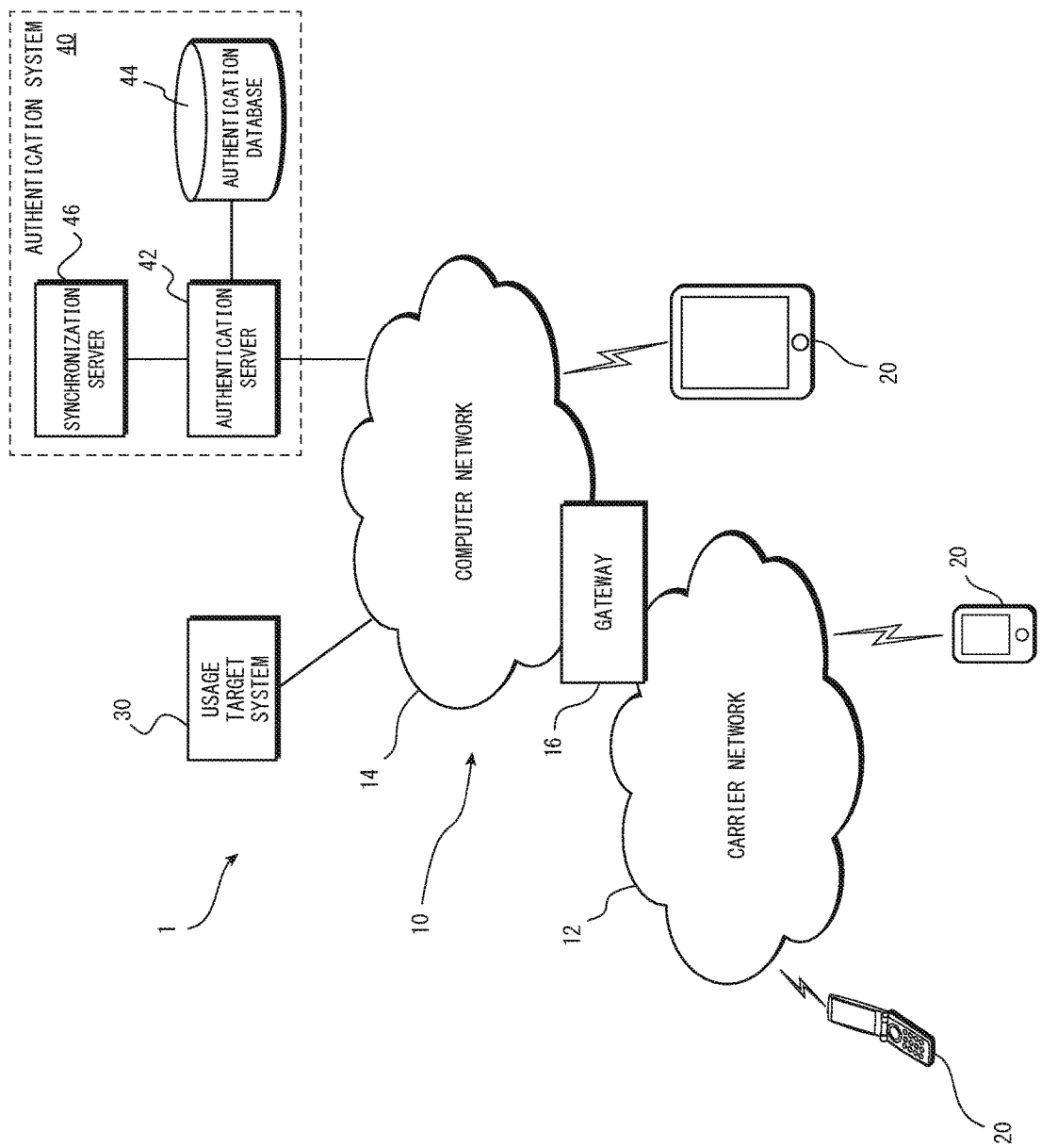
FIG. 1 is a schematic view showing an example of a configuration of a computer system for implementing a user authentication method according to an embodiment of the present invention.

Embodiments of the present invention will be described below with reference to the drawings. Note that the embodiments described below are merely exemplary, and are not intended to exclude the application of various modifications and techniques not described explicitly below. The present invention can be variously modified (by combining respective embodiments or the like, for example) and implemented thus without departing from the spirit thereof. In addition, in the following description of the drawings, identical or similar parts are represented using identical or similar reference numerals. The drawings are schematic, and do not necessarily correspond to actual dimensions, ratios, and so on. Moreover, in certain cases the drawings include portions that are different from each other in terms of dimensional relationship or ratio.

[First Embodiment]

(Outline)

This embodiment may relate to a user authentication method that switches to and executes one of a plurality of user authentication procedures selectively in accordance with a predetermined communication environment in which a user is located (e.g., the signal condition of an information communication terminal carried by the user), and a system for implementing this method. For example, if communication between the information communication terminal and the authentication system is available, a first user authentication procedure may be executed, whereas, if communication between the information communication terminal and the authentication system is not available, a second user authentication procedure may be executed. In the first user authentication procedure, the information communication terminal may transmit an authentication request prior notification to the authentication system before user authentication is performed based on a password, and the authentication system may perform user authentication based on a password transmitted from a usage target system on condition that the authentication request prior notification has been received. In the second user authentication procedure, the information communication terminal may display a token code (e.g., an additional code) generated so as to be synchronized with a token code generated on the authentication system side on a user interface instead of transmitting the authentication request prior notification, and the authentication system may perform user authentication based on the password transmitted from the usage target system and the additional code. The password is input by, for example, having the user extract numerals, characters, symbols, or the like corresponding to a password derivation pattern owned by the user from a code table displayed on the user interface of the information communication terminal.

FIG. 1 is a schematic view showing an example of a configuration of a computer system for implementing a user authentication method according to an embodiment of the present invention. As shown in the drawing, a computer system 1 may be configured to include, for example, an information communication terminal 20, a usage target system 30, and an authentication system 40, which are connected to each other communicably via a communication network 10.

The communication network 10 may include, for example, a carrier network 12 for a cellular phone, a smart phone, or the like, and an IP-based computer network 14. Here, the computer network 14 encompasses a broad concept that includes the Internet, which is constructed from mutually connected IP networks, but the computer network 14 is not limited to an IP network, and networks of any protocol that allows inter-node communication can be used. Further, the computer network 14 may include a wireless network constructed from wireless base stations (e.g., wireless base stations operable in accordance with IEEE 802.11 standards, which are also commonly referred to as Wi-Fi base stations), not shown. The carrier network 12 and the IP network 14 may be connected via a gateway 16 or the like, for example, but are not limited thereto.

The information communication terminal 20 may typically be a computing device owned by a user, and may correspond to, but not be limited to, a personal computer, a cellular phone, a PDA, a feature phone, a smartphone, a tablet computer, or another intelligent device, for example. The information communication terminal 20 is assumed here to be a smartphone having a touch panel. The information communication terminal 20 can be connected communicably to the computer network 14 via a network operable in accordance with IEEE 802.11 standards, which is also commonly referred to as a Wi-Fi network, not shown, or can be connected communicably to the computer network 14 from the carrier network 12 via the gateway 16, for example. By way of this, the information communication terminal 20 can access various nodes (a web server or a cloud server, for example) on the communication network 10. The information communication terminal 20 may typically be configured to include a control module having a CPU and a memory, and a communication module, but since the hardware configuration thereof is already known, description thereof will be omitted here. It is noted that in the user authentication method according to this embodiment, it is envisaged that the information communication terminal 20 may be used in a location or area that is not reached by a signal in accordance with IEEE 802.11 standards, which is also commonly referred to as a Wi-Fi signal, or a carrier signal. Further, the present invention does not exclude the use of a simple information terminal not having a communication function (a one-time password generation device, for example) instead of the information communication terminal 20.

In this embodiment, the information communication terminal 20 may be installed with an application program for generating a code table (see FIG. 8) and displaying the generated code table on a user interface. The application program may be configured to include, for example, a software token 22 (see FIG. 2), namely, a program (referred to hereafter as a "security token program") for implementing a security token function. Accordingly, the information communication terminal 20 can generate a token code that is in synchronization with a token code generated by a synchronization server 46 by executing the security token program under the control of a processor. The token code may be generated, for example, at predetermined time intervals (e.g., every minute, every three minutes, or the like) or predetermined event intervals (e.g., every time the user performs an authentication request operation). Hence, a different token code is generated every time, and therefore the token code may also be referred to as a one-time password (OTP). More specifically, security token programs having identical password generation algorithms may be installed in the information communication terminal 20 and the synchronization server 46. As a result, the information communication terminal 20 and the synchronization server 46 can generate token codes that have identical values and are in synchronization with each other using identical seeds. The synchronization server 46 may specify a password generation algorithm in accordance with a token ID assigned to each security token program, for example.

A known algorithm may be used as the password generation algorithm, and therefore the token code may be generated, for example, from a certain seed using a mathematical algorithm such as a hash function. A seed that uses a specific time such as the present time or a designated time in the past or the like, a seed that uses a previously generated token code, or a seed that uses a combination thereof, for example, may be used as the seed. Alternatively, a value derived from the token ID assigned to each security token program or information on the user (e.g., the name, birthday, or email address of the user, a combination thereof, or the like) or the like may be used. For example, the security token program may generate the seed by applying a predetermined conversion algorithm to the token ID.

It is noted that a security token (i.e., a hardware token (not shown)) constituted by a physical device may be used instead of a software token. The hardware token may be connected to the information communication terminal 20 via, for example, a USB interface or the like. Alternatively, the hardware token may be connected to the information communication terminal 20 via short-range wireless communication such as BLUETOOTH (registered trademark) or near-filed communication (NFC). For example, when the hardware token is connected to the information communication terminal 20, a token code may be generated in the interior thereof, and the generated token code may be provided to the information communication terminal 20. Hereinafter, a software token and a hardware token will be referred to simply as a security token without making any distinction therebetween.

Further, the information communication terminal 20 may store a password derivation pattern. The password derivation pattern may include a pattern and a rule for deriving a password, as will be described below. The password derivation pattern may be obtained by defining an arrangement pattern and a selection order of a group of specific elements selected by a user in any order from a plurality of cells (elements) constituting a certain geometric pattern. In other words, the password derivation pattern may be an arrangement rule indicating a plurality of cells selected from the geometric pattern and an order in which the plurality of cells is selected. It is noted here that the password derivation pattern does not denote the specific values themselves that are assigned to specific elements in the geometric pattern, and merely represents information indicating which cells are selected in what order.

The usage target system 30 may be a system which the user wishes to use, and may typically request user authentication via a user interface thereof when used by the user. The usage target system 30 may be a web server that configures a web site or a cloud server that provides cloud services, for example. In this case, the user can typically access this type of sever using the information communication terminal 20. As another example, the usage target system 30 may be a personal computer owned by the user. As further examples, the usage target system 30 may be a door opening/closing system for an automatic locker (a coin locker) or a security room, an automatic teller machine (ATM), or the like. The usage target system 30 may be configured to be capable of communicating with the information communication terminal 20 by, for example, NFC. As a further example, the usage target system 30 maybe a function or an application implemented by executing the aforesaid application program in the information communication terminal 20.

Figure 18:
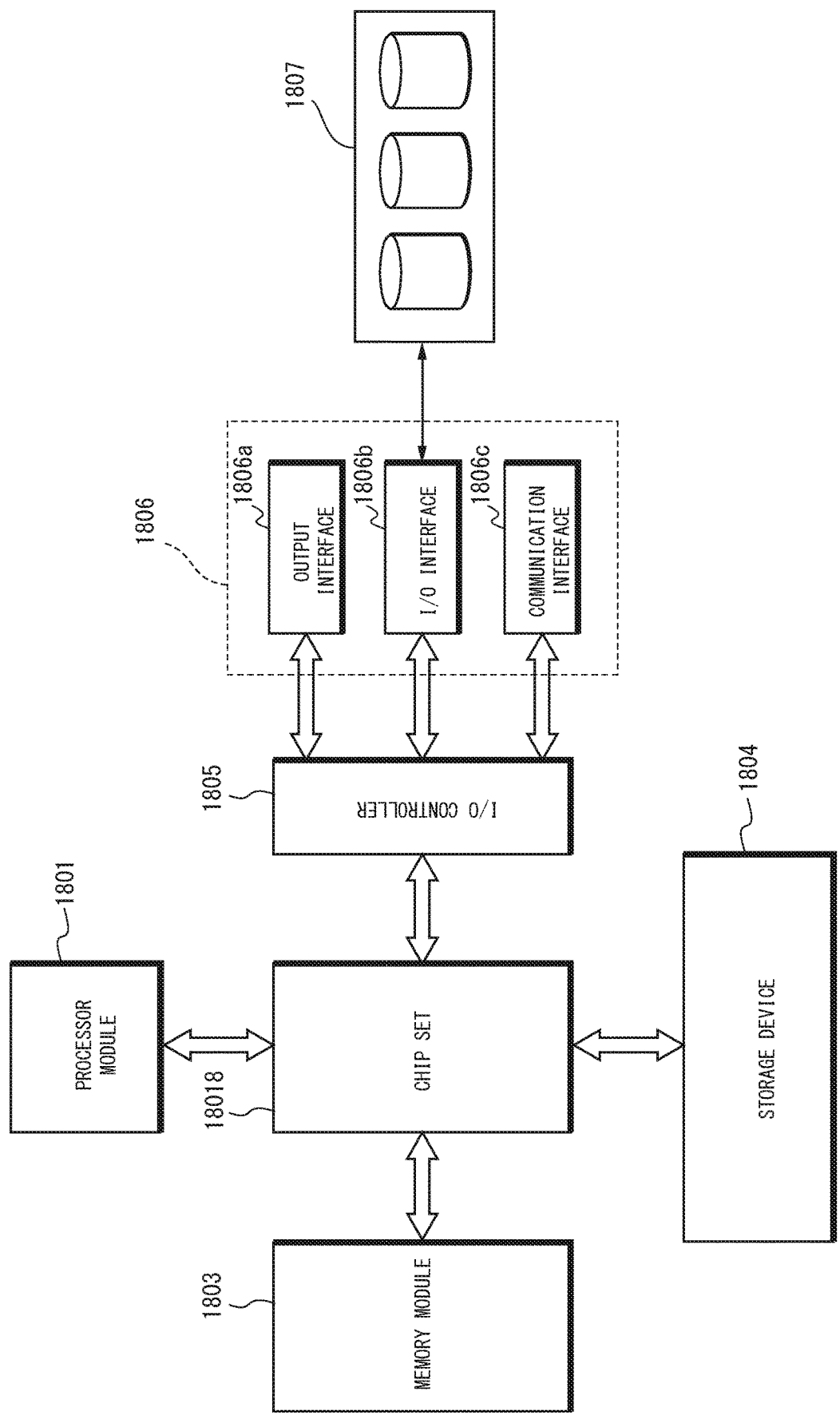
FIG. 18 is a schematic view showing an example of a configuration of a computing device used in a user authentication method according to an embodiment of the present invention.

The authentication system 40 may be a computer system which authenticates a user who wishes to use the usage target system 30. The authentication system 40 may be configured to include, via an intranet such as a LAN, for example, an authentication server 42, an authentication database 44, the synchronization server 46, and so on. The authentication system 40 can be implemented by, for example, one or more general-purpose computing devices. An example hardware configuration of this type of computing device is shown illustratively in FIG. 18, but since this hardware configuration is already known, detailed description thereof will be omitted. The authentication system 40 may be connected communicably to the information communication terminal 20 and the usage target system 30 via the communication network 10, for example, using a secure communication technique such as SSL.

The authentication server 42 may be a server computer which perform overall control of user authentication processing in cooperation with the authentication database 44 and the synchronization server 46. The authentication database 44 may be a database for managing user account information which is registered in advance by each individual user and is required for user authentication. The authentication database 44 may, for example, manage information relating to users who can use the usage target system 30 and information relating to the security tokens of the respective users as the user account information.

The synchronization server 46 may be a server computer which uses information relating to the security token of each user and a seed to generate a token code which is in synchronization with a token code generated by a security token of a specific user in accordance with a corresponding password generation algorithm. The seed may be generated from, for example, information (e.g., the token ID) relating to the security token using a predetermined conversion algorithm, and managed for each user in a database, not shown, in the synchronization server 46. The synchronization server 46 may provide the authentication server 42 with a token code which is in synchronization with the token code generated by the security token of the specific user in response to a request from the authentication server 42, for example.

It is noted that the authentication server 42 may be configured as a single computing device which includes the functions of the authentication database 44 and the synchronization server 46. The functional or logical configuration of the authentication system 40 may be arbitrarily determined.

Further, in this example, operation entities of the usage target system 30 and the authentication system 40 are different from each other and are assumed to be, but are not limited to, computer systems that are physically removed from each other. In addition, for example, the same business operator may operate both the usage target system 30 and the authentication system 40, and the usage target system 30 and authentication system 40 may be constituted by one or a plurality of computer systems. In this case, the usage target system 30 may be configured to include the functions of the authentication system 40 (or vice versa).

Figure 2A:
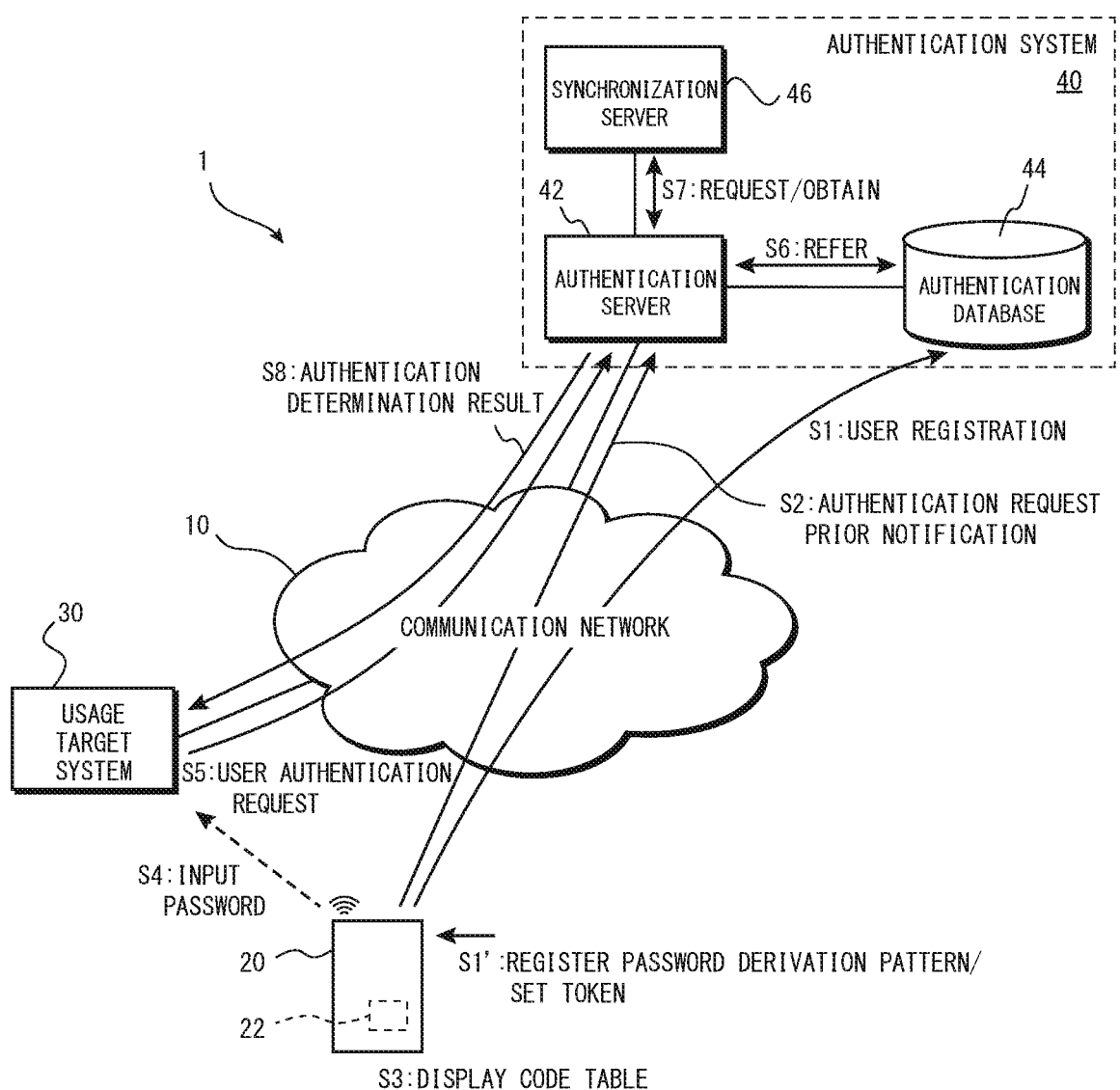
FIG. 2A is a view illustrating a scheme of a user authentication method according to an embodiment of the present invention.
Figure 2B:
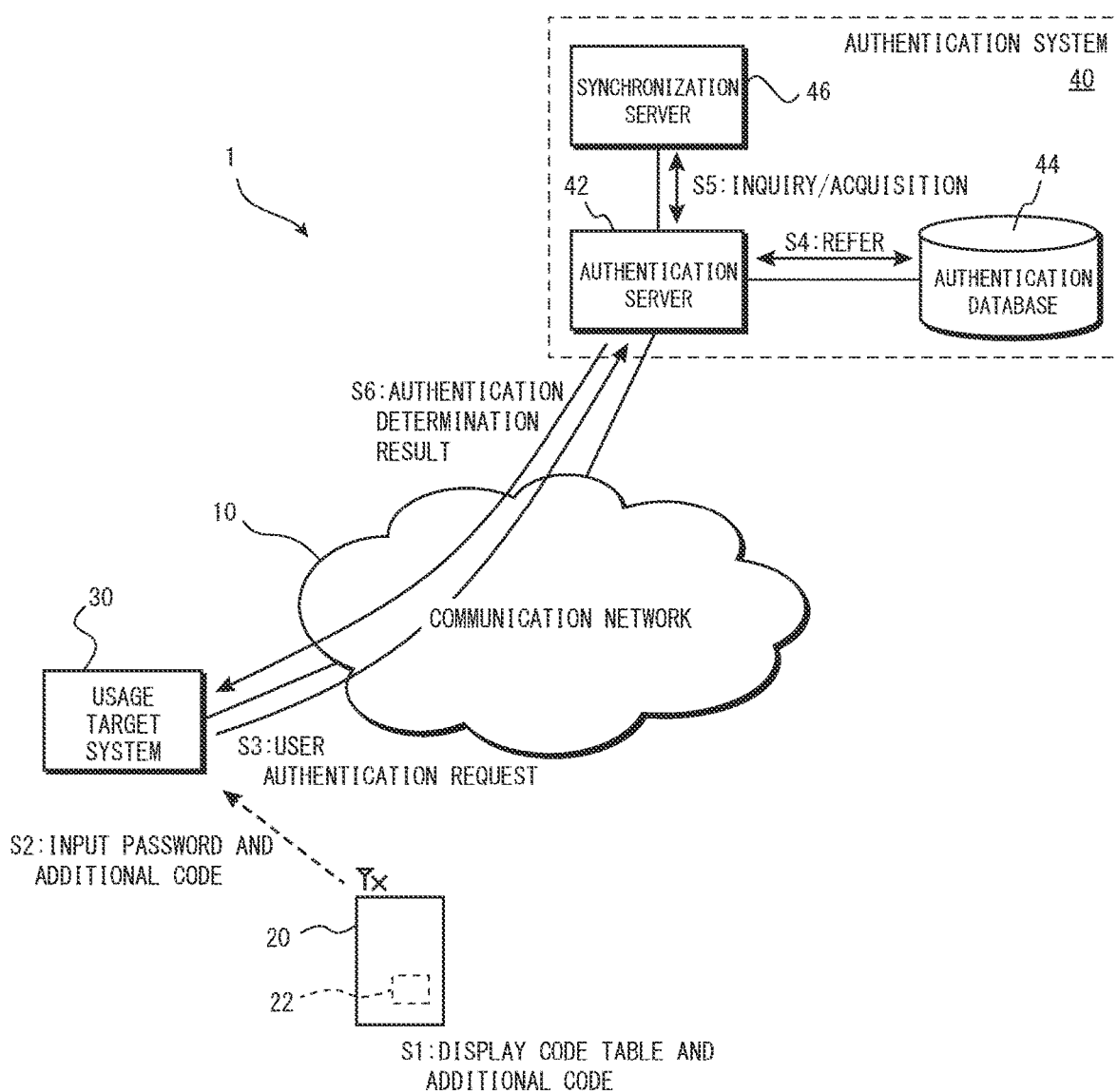
FIG. 2B is a view illustrating a scheme of a user authentication method according to an embodiment of the present invention.

Next, a user authentication method achieved by the computer system 1 having the above configuration will be described. As described above, in the user authentication method according to this embodiment, predetermined user authentication procedures may be switched selectively in accordance with the environment in which the user is located, or in other words depending on whether or not the information communication terminal 20 is in a communicative condition, and therefore these cases will be described separately. More specifically, FIG. 2A shows a user authentication procedure (a first user authentication procedure) implemented if the information communication terminal 20 is in the communicative condition, whereas FIG. 2B shows a user authentication procedure (a second user authentication procedure) implemented if the information communication terminal 20 is in a non-communicative condition. It may be assumed that user is performing the information communication terminal 20, which can be connected to the communication network 10, and is in an environment where the user interface of the usage target system 30 can be operated directly. As an example, the usage target system 30 may be a password-protected automatic locker disposed in a railway station or the like. As another example, the user may use the usage target system 30 which provides a web service by way of using a personal computer.

First, referring to FIG. 2A, before using the usage target system 30 which requests user authentication, the user may first perform user registration with the usage target system 30, set a software token, and register a password derivation pattern in the information communication terminal 20 (S1 and S1').

More specifically, the user may, for example, register his/her own user account information relating to the usage target system 30 in the authentication database 44 of the authentication system 40 in advance using the information communication terminal 20. For example, if the user has installed an application program for using the usage target system 30 in the information communication terminal 20 but does not yet have a user account, the user may be guided to a user account registration screen via the user interface of the information communication terminal 20, and may register his/her user account information therein. The user account information may be registered using, for example, a personal computer, instead of the information communication terminal 20. If the user already has a user account and the user account information has been registered in the authentication database 44, these steps may be omitted.

Further, if the security token program (the software token 22) is not installed in the information communication terminal 20, the user may install the security token program and register the token ID assigned to the security token program in the authentication database 44. The security token program may be configured as a part of the application program. Moreover, the token ID may be registered during the aforesaid processing for registering the user account information.

Furthermore, the user may register a password derivation pattern in the information communication terminal 20. For example, the user may execute an application program installed in the information communication terminal 20 and register a password derivation pattern in accordance with registration processing implemented thereby. The registered password derivation pattern may, for example, be held in a memory of the information communication terminal 20 in an encoded condition, for example, as data referred to by the application program. The password derivation pattern may likewise be registered during the aforesaid processing for registering the user account information.

To use the usage target system 30, the user may activate a corresponding application program by operating the information communication terminal 20. The information communication terminal 20 may check the signal condition in accordance with execution of the application program, and if it is determined that communication is available, the information communication terminal 20 may transmit an authentication request prior notification indicating that a user authentication procedure may possibly be activated to the authentication server 42 (S2). The authentication request prior notification may be transmitted to the authentication server 42 directly from the information communication terminal 20, or may be transmitted to the authentication server 42 via the usage target system 30. Having received the authentication request prior notification from the user, the authentication server 42 may perform control so as to, for example, accept only a user authentication request that is received within a predetermined time in relation to the same user. More specifically, having received the authentication request prior notification from the user, the authentication server 42 may enable an authentication request flag associated with the same user for only a predetermined time and then wait for an authentication request from the user. Further, the authentication server 42 may notify the usage target system 30 that the authentication request prior notification has been received at the reception timing of the authentication request prior notification (i.e., before providing notification of an authentication determination result). For example, if the user inputs a system ID of the usage target system 30 into the user interface of the information communication terminal 20, the information communication terminal 20 may transmit the system ID to the authentication server 42 together with the authentication request prior notification, and upon reception thereof, the authentication server 42 may transmit a message indicating that the authentication request prior notification has been received to the usage target system 30 corresponding to the system ID.

Further, the information communication terminal 20 may display a code table on the user interface thereof (S3). As will be described below, the code table may be configured to include numerals or the like assigned randomly at first glance to a plurality of elements forming a geometric pattern. On the code table according to this embodiment, numerals or the like forming the token code generated by the security token program of the information communication terminal 20 may be assigned respectively to the elements forming the password derivation pattern of the user, and random numerals or the like may be assigned to the remaining elements. In other words, the code table may be configured by embedding a token code which is in synchronization with the token code of the authentication system 40 in the elements corresponding to the password derivation pattern. To put it another way, the numerals or the like assigned to the elements other than the elements corresponding to the password derivation pattern of the user may be presented to the user in order to camouflage the numerals or the like assigned to the elements corresponding to the password derivation pattern.

The user may display a login screen (e.g., an authentication target information input screen) for inputting login information (authentication target information) such as a password by operating the user interface of the usage target system 30. The user may refer to the displayed code table to extract the numerals or the like assigned to the elements corresponding to the password derivation pattern in order, and input the extracted numerals or the like into the user interface of the usage target system 30 as the password (S4). Alternatively, the information communication terminal 20 may be configured to receive input of the extracted password via the user interface thereof and transfer the input password to the usage target system 30 by, for example, NFC.

If the user selects a login button, for example, after inputting the password into the login screen of the usage target system 30, the usage target system 30 may receive the login information, such as the input password, and transmit a user authentication request including the login information to the authentication server 42 (S5). The usage target system 30 may include its own system ID in the user authentication request, which may then be transmitted to the authentication server 42. By way of this, the authentication server 42 can respond to user authentication requests from different usage target systems 30.

If the authentication server 42 receives the user authentication request from the usage target system 30 following reception of the authentication request prior notification, the authentication server 42 may check whether or not the authentication request flag is enabled, and if the authentication request flag is enabled, the authentication server 42 may enter the user authentication processing. More specifically, the authentication server 42 may specify the token ID of the user by referring to the authentication database 44 (S6). Next, the authentication server 42 may obtain the token code of the user from the synchronization server 46 by requesting a token code which is in time-synchronization with the security token of the user from the synchronization server 46 based on the token ID (S7). Having obtained the token code of the user, the authentication server 42 may perform an authentication determination by comparing the obtained token code with the password transmitted from the user, and transmit an authentication determination result to the usage target system 30 (S8). It is noted that when the authentication request flag is determined to be disabled and an additional code is not included in the user authentication request, as will be described below, the authentication server 42 may refrain from performing any further user authentication processing, and transmit a determination result indicating failed authentication to the usage target system 30.

Hence, the usage target system 30 may advance to subsequent processing in accordance with the authentication determination result. For example, when the authentication determination result indicates failed authentication, the user may be notified that login has failed, and when the authentication determination result indicates successful authentication, login may be accepted and the user may, for example, be provided with a predetermined processing result or receive a service.

Next, a case in which the information communication terminal 20 is in a non-communicative condition will be described with reference to FIG. 2B. It is assumed in this example that user registration in the usage target system 30, software token setting, and registration of the password derivation pattern in the information communication terminal 20, as described above, have all been completed before using the usage target system 30 which requests user authentication.

To use the usage target system 30, the user may activate a corresponding application program using the information communication terminal 20. The information communication terminal 20 may check the signal condition in accordance with execution of the application program, and if it is determined that communication is not available, the information communication terminal 20 may display the code table and the additional code on the user interface thereof (S1). The additional code may likewise be a token code generated by the security token program of the information communication terminal 20, and may be generated so as to be in synchronization with the token code on the authentication system 40 side. The additional code may be represented by numerals or the like (CAPTCHA) within image data that cannot be recognized easily by a computer, for example. It is noted that the additional code may include, for example, dummy numerals or the like, as well as the token code.

The user may display the login screen on which to input login information such as a password by operating the user interface of the usage target system 30. The user may refer to the displayed code table to extract the numerals or the like assigned respectively to the elements corresponding to the password derivation pattern in order, and input the extracted numerals or the like into the user interface of the usage target system 30 as the password together with the displayed additional code (S2). Alternatively, the information communication terminal 20 may be configured to receive input of the extracted password and/or additional code via the user interface thereof and transfer the input information to the usage target system 30 by, for example, NFC.

If the user selects a login button, for example, after inputting the password and the additional code into the login screen of the usage target system 30, the usage target system 30 may receive the login information, such as the input password and additional code, and transmit a user authentication request including the login information to the authentication server 42 (S3). The usage target system 30 may include its own system ID in the user authentication request, which may then be transmitted to the authentication server 42. By way of this, the authentication server 42 can respond to user authentication requests from different usage target systems 30.

In this example, if the authentication server 42 receives the user authentication request from the usage target system 30, an authentication request prior notification has not been received, and therefore the authentication server 42 may check whether or not the user authentication request includes the additional code, and if the additional code is included, the authentication server 42 may enter the user authentication processing. More specifically, the authentication server 42 may specify the token ID of the user by referring to the authentication database 44 (S4). Next, the authentication server 42 may obtain a set including a first token code and a second token code of the user from the synchronization server 46 by requesting a set of token codes that are in synchronization with the security token of the user from the synchronization server 46 based on the token ID (S5). Having obtained the set of the first and second token codes of the user, the authentication server 42 may perform an authentication determination by comparing the obtained token codes respectively with the password and additional code transmitted from the user, and transmit an authentication determination result to the usage target system 30 (S6). It is noted that if the authentication request flag is determined to be disabled and the additional code is not included in the user authentication request, the authentication server 42 may transmit a determination result indicating failed authentication to the usage target system 30.

Therefore, the usage target system 30 may advance to subsequent processing in accordance with the authentication determination result. For example, if the authentication determination result indicates failed authentication, the user may be notified that login has failed, whereas if the authentication determination result indicates successful authentication, login may be accepted, and the user may, for example, be provided with a predetermined processing result or receive a service.

It is noted that in the example described above, the usage target system 30 transmits the additional code to the authentication server 42 together with the password, but the password and the additional code may be transmitted at separate timings. More specifically, the usage target system 30 may transmit a first user authentication request including the additional code to the authentication server 42 first, and may transmit a second user authentication request including the password to the authentication server 42 in response to an authentication processing authorization message transmitted from the authentication server 42 in response to the first user authentication request.

Further, an example in which the user authentication procedure is switched selectively based on the environment in which the user is located was described herein, but the present invention is not limited to this example, and thus the user authentication procedure may be switched based on a condition of a communication session between the information communication terminal 20 and the authentication system 40. For example, the user authentication procedure may be switched based on a communication condition derived from devices or configurations other than the information communication terminal 20, such as the condition of the communication network 10 or the condition of the authentication system 40. For example, the information communication terminal 20 may transmit an authentication request prior notification to the authentication server 42, and may determine that communication is possible after receiving a reception completion notification in response thereto. Alternatively, the information communication terminal 20 may determine that communication is possible after establishing a communication session with the authentication server 42, i.e., before transmitting the authentication request prior notification thereto.

(Description of Password Derivation Pattern)

Figure 3:
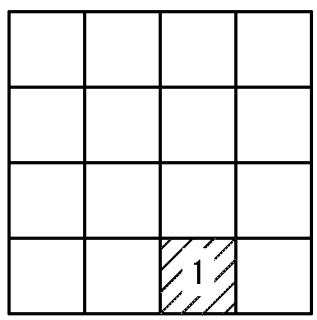
FIG. 3 is a view illustrating a password derivation pattern used in a user authentication method according to an embodiment of the present invention.
Figure 3:
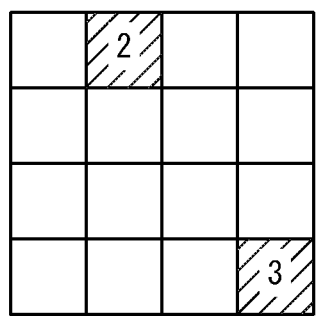
Figure 3:
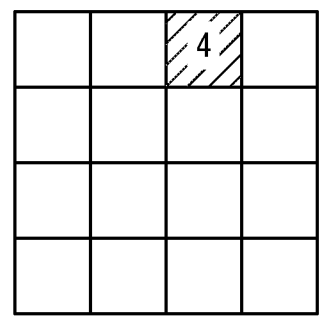
Figure 3:
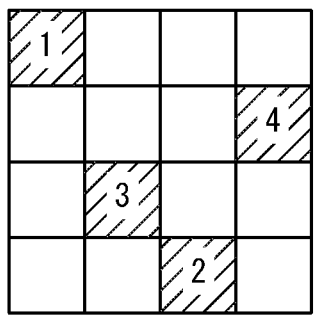
Figure 3:
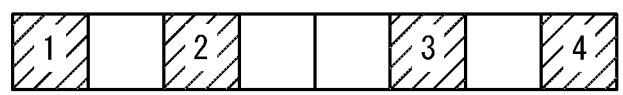

FIG. 3 is a view illustrating the password derivation pattern used in the user authentication method according to this embodiment of the present invention.

More specifically, FIG. 3(*a*) is a view showing an example of a geometric pattern constituted by a matrix having four rows and twelve columns. In this example, the geometric pattern may be divided into blocks of four rows and four columns each so as to be more easily visible to the user. In FIG. 3(*a*), the elements selected by the user are shaded so as to be visually distinguishable, and numbers are written in these elements in the order in which the elements are selected. The elements selected by the user from the geometric pattern may serve as the password derivation pattern. Each element may be specified by, for example, "(row number, column number)". Thus, the password derivation pattern according to this example may be expressed as, for example, "(3, 2), (0, 5), (3, 7), (0, 10)." alternatively, if sequential numbers are assigned in order with the top left element of the leftmost block set as "0," the password derivation pattern may be expressed as "14, 17, 31, 34."

Further, FIG. 3(*b*) is a view showing an example of a geometric pattern constituted by a matrix having four rows and four columns The password derivation pattern in this case may be expressed as, for example, "(0, 0), (3, 2), (2, 1), (1, 3)." Alternatively, if sequential numbers are used, the password derivation pattern may be expressed as "0, 14, 9, 7." Further, FIG. 3(*c*) is an example of a geometric pattern constituted by a matrix having one row and one column.

The password derivation pattern may be used to allow user authentication, and may serve as an element arrangement rule to be memorized by the user. In this sense, the password derivation pattern may be considered as a type of password. The number of elements (e.g., six) forming the geometric pattern and the password derivation pattern therein, and the arrangement structure thereof, are arbitrary, and may be set as appropriate in accordance with the security level applied to user authentication. It is noted that the concept of the password derivation pattern is described in detail in Patent Document 1.

Figure 4A:
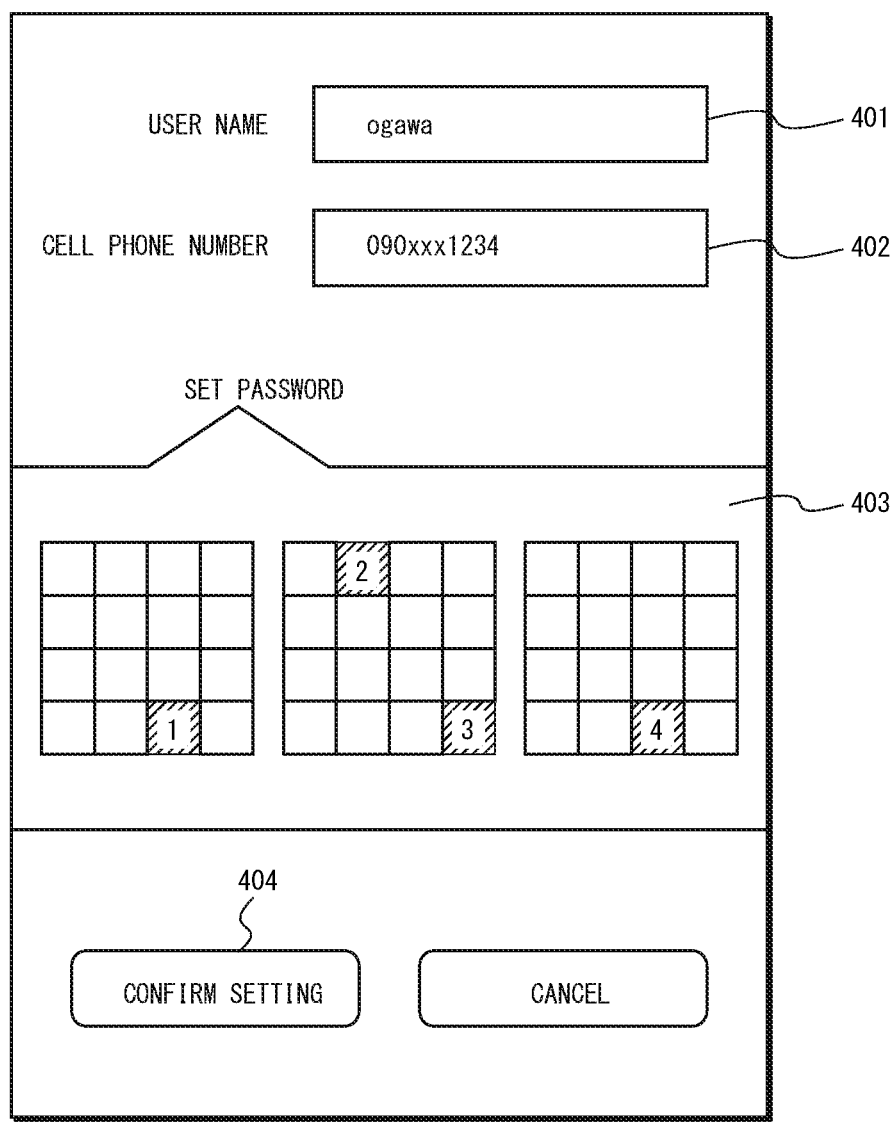
FIG. 4A is a view showing an example of a password derivation pattern registration screen used in a user authentication method according to an embodiment of the present invention.

FIG. 4A is a view showing an example of a password derivation pattern registration screen employed in the user authentication method according to this embodiment of the present invention. In this embodiment, a registration screen of this type may be achieved by a function of an application program installed in the information communication terminal 20, but is not limited thereto. In another embodiment, a registration screen of this type may be configured using a screen configuration program described in accordance with a page description language (e.g., HTML5 or the like), and may be provided by accessing an administration side computer system (e.g., the usage target system 30 or the authentication server 42).

Referring to FIG. 4A, the password derivation pattern registration screen may include, for example, a user name input field 401, a cellular phone number input field 402, and a password derivation pattern input field 403.

The user name input field 401 may be a field for inputting a user name using the usage target system 30. The user name may be a character string or the like that is identified uniquely in the usage target system 30, and the email address of the user, for example, may be used. For example, if the user taps the user name input field 401, a software keyboard may be displayed and used to input the character string or the like. The user may tap the field using, for example, a finger or a stylus.

The cellular phone number input field 402 may be a field for inputting individual identification information for specifying the information communication terminal 20 to be used for user authentication while using the usage target system 30. It is assumed in this embodiment that the cellular phone number assigned to the information communication terminal 20 owned by the user is used as is, but the present invention is not limited thereto, and a device ID such as a MAC address, for example, may be used instead. It is noted that the cellular phone number input field 402 may be omitted. For example, the cellular phone number input field 402 may be omitted in a case where the usage target system 30 is a system which is implemented by executing an application program.

The password derivation pattern input field 403 may be configured to include a geometric pattern constituted by a plurality of, for example, 48 elements disposed in the form of a matrix having four rows and twelve columns. In this example, the geometric pattern is divided into blocks of four rows and four columns each. The user may select the elements corresponding to the password derivation pattern to be registered in order from the geometric pattern by tapping a predetermined number of elements. The elements selected by tapping may be highlighted, for example, in a predetermined color so as to be visually distinguishable, and numbers indicating the selection order may be displayed in the elements. The drawing shows that an element "(3, 2)" has been selected first. The order in which the elements are selected herein may correspond to the password derivation pattern.

Figure 4B:
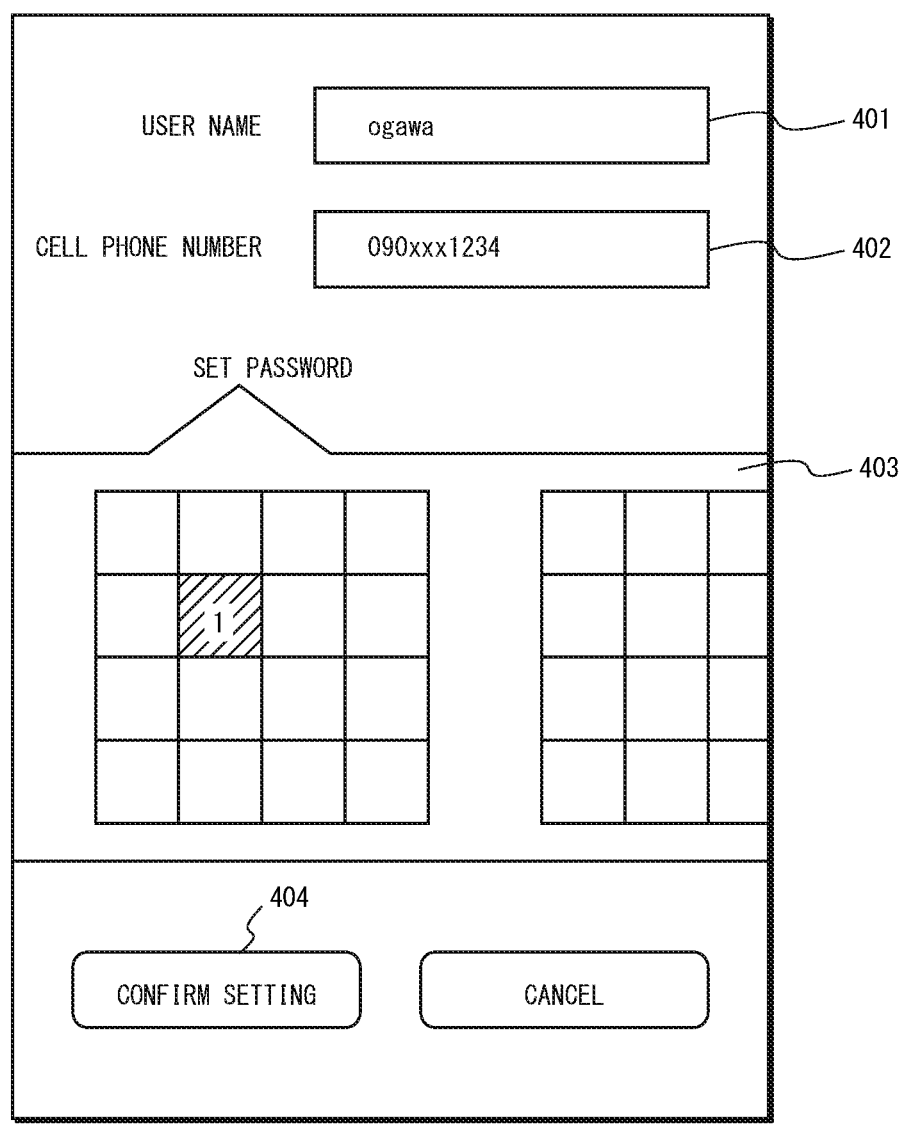
FIG. 4B is a view showing another example of a password derivation pattern registration screen used in a user authentication method according to an embodiment of the present invention.

In view of the screen size and display content of the information communication terminal 20, the password derivation pattern input field 403 may be configured as shown in, for example, FIG. 4B such that at least a part of the geometric pattern (e.g., one block) is displayed virtually. In this case, the user can scroll through the password derivation pattern input field 403 by swiping or flicking the field 403 in a lateral direction so that the part not shown on the screen is displayed on the screen, and can then tap and select the individual elements on the displayed part. Alternatively, if the user holds the information communication terminal 20 horizontally, the information communication terminal 20 may detect this and rotate the content displayed on the screen 90 degrees so that the entire element group of the geometric pattern is displayed.

In a process of password derivation pattern registration, for example, the same element may be selected twice or more. For example, an element selected twice may be highlighted in a different color, and two numbers may be displayed therein. In this case, the respective numbers may be displayed using, for example, a balloon to prevent the numbers from overlapping each other and thereby becoming indistinguishable. In addition, the order in which the elements are selected may be indicated by a line linking the selected cells on the geometric pattern instead of or in addition to the numbers.

Further, the elements may be selected by performing a dragging motion over the geometric pattern in a single stroke instead of a tapping motion. That is, the user may draw a substantially straight line while performing a dragging motion with the first selected element used as the starting point, and select a predetermined number of elements while temporarily stopping on the elements to be selected. The information communication terminal 20 may receive input information while specifying an operation action such as tapping, dragging, or swiping in accordance with a position touched by, for example, a finger on the registration screen and a contact time.

If the user taps a setting confirmation button 404 after inputting the required information into the respective input fields 401 to 403, the information communication terminal 20 may provisionally register the password derivation pattern based on the input information as registration data, whereupon a setting confirmation screen may be displayed on the user interface of the information communication terminal 20.

Figure 5A:
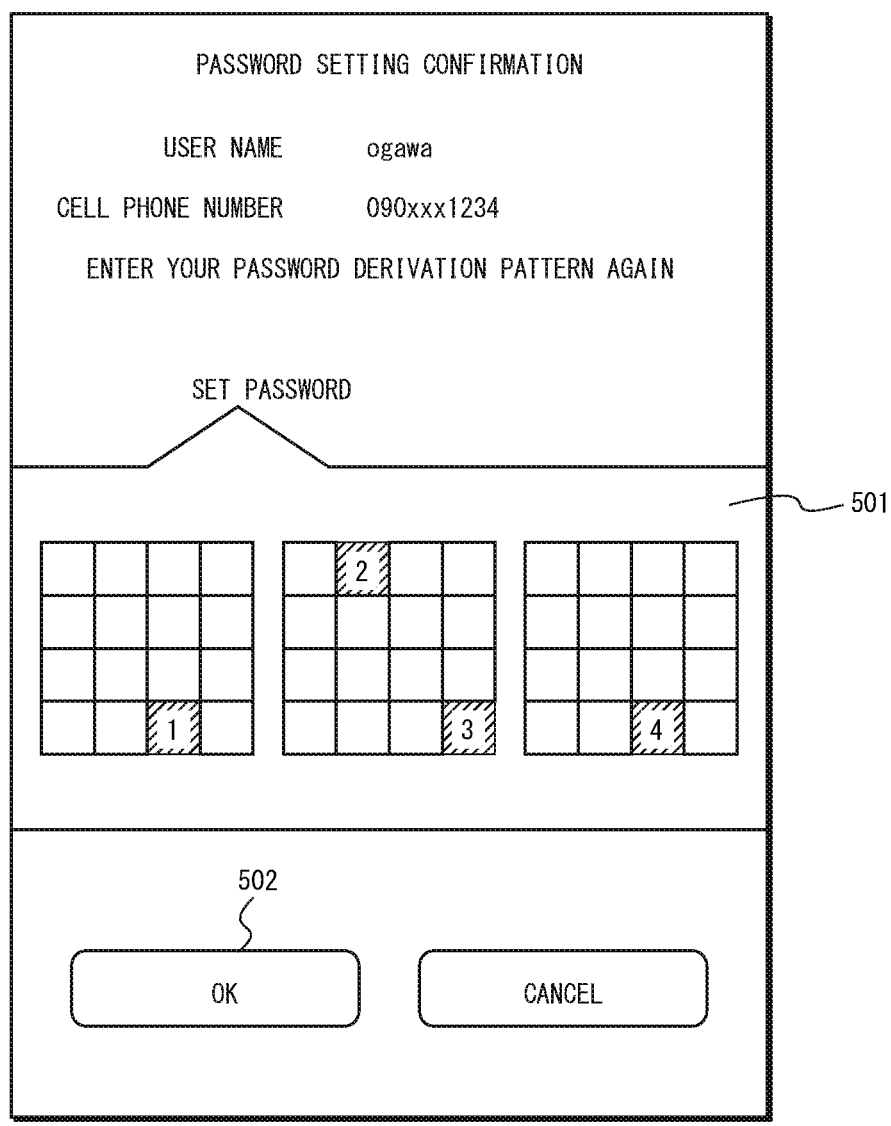
FIG. 5A is a view showing an example of a setting confirmation screen displayed on a user interface of an information communication terminal in a user authentication method according to an embodiment of the present invention.
Figure 5B:
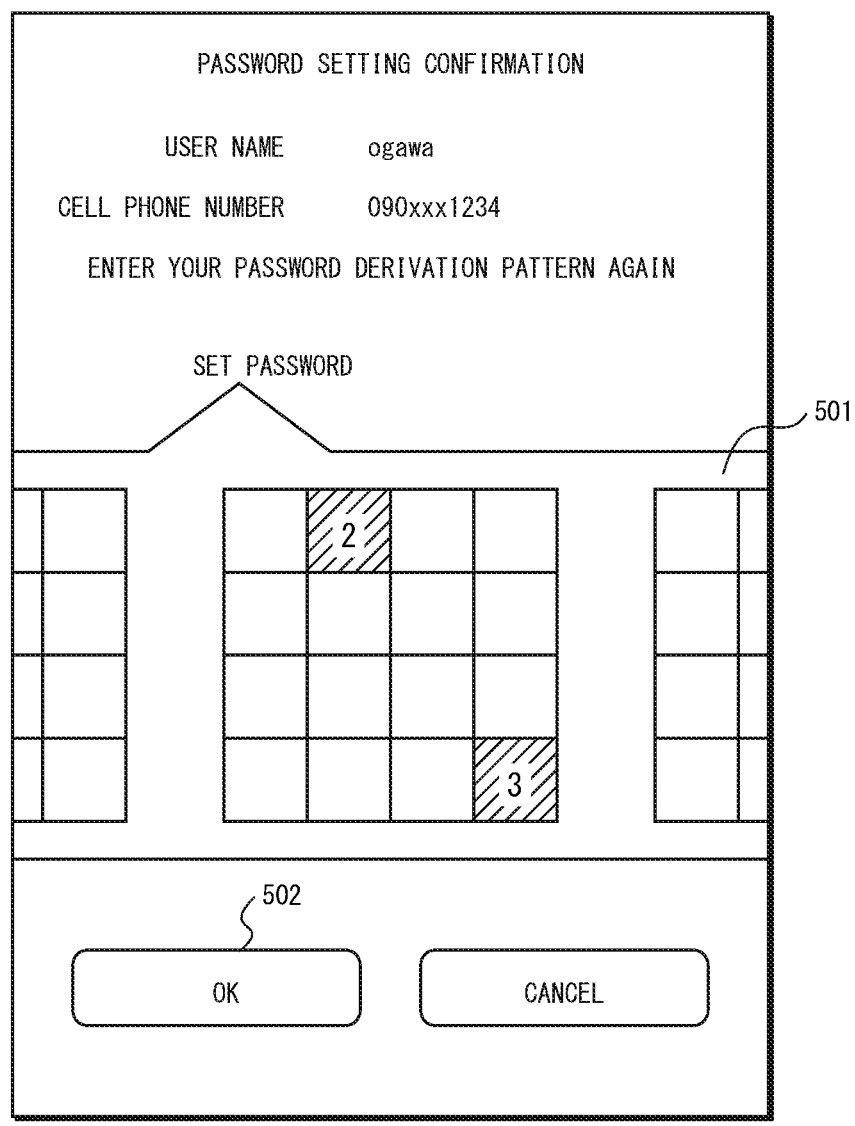
FIG. 5B is a view showing another example of a setting confirmation screen displayed on a user interface of an information communication terminal in a user authentication method according to an embodiment of the present invention.

The setting confirmation screen may be a screen for allowing the user to select the respective elements of the password derivation pattern again in order to confirm the password derivation pattern. FIG. 5A is a view showing an example of the setting confirmation screen displayed on the user interface of the information communication terminal 20. Further, FIG. 5B is a view showing an example of a setting confirmation screen corresponding to the registration screen shown in FIG. 4B.

As shown in FIG. 5A, the setting confirmation screen may include a password input field 501 including a geometric pattern. The user may select elements corresponding to the password derivation pattern which was provisionally registered previously from the geometric pattern in the same order. If the user selects an OK button 502 after selecting the predetermined elements of the geometric pattern in the password input field 501, the information communication terminal 20 may determine whether or not the password derivation pattern which was provisionally registered previously matches the current password derivation pattern, and having determined that the patterns match, may register the password derivation pattern officially as the data to be referred to by the application program.

It is noted that in this example, it is assumed that the setting confirmation screen is provided to the user only once, but the present invention is not limited thereto, and the setting confirmation screen may be provided in a plurality of iterations. Iteration may, for example, be implemented forcibly in accordance with the will of the user by selecting an iteration button (not shown), or in accordance with the elapsed time during input (e.g., if input takes a long time or the like). By way of iteration in this manner, the user can be encouraged to memorize his/her password derivation pattern.

The password derivation pattern may be registered by way of using a different method to the method described in this description. For example, a password derivation pattern registration method disclosed in Patent Document 1 may be applied to the present invention.

(Description of Authentication Database)

Figure 6:
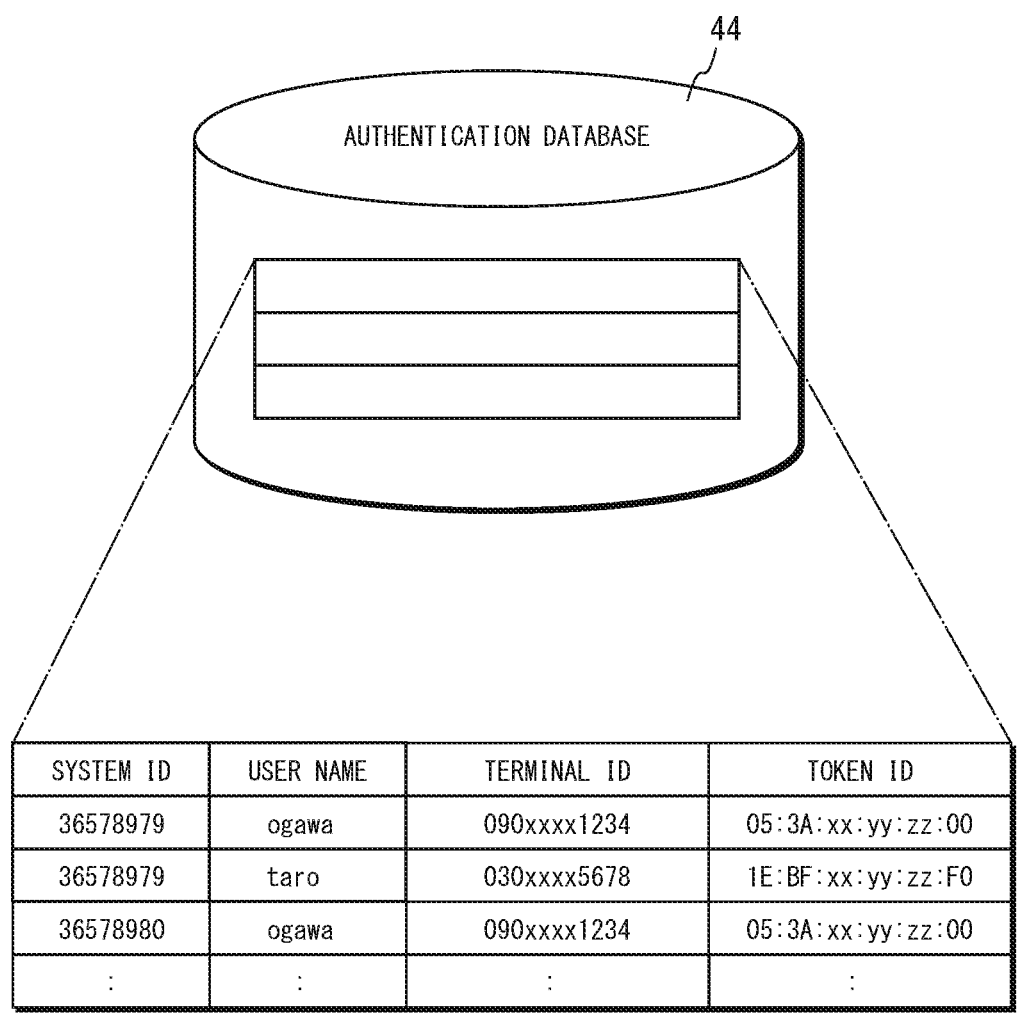
FIG. 6 is a view showing an example of a data structure of an authentication database used in a ser authentication method according to an embodiment of the present invention.

FIG. 6 is a view showing an example of a data structure of the authentication database used in the user authentication method according to this embodiment of the present invention. The authentication database 44 may, for example, manage the user account information of each user as a single record with respect to each usage target system 30.

More specifically, as shown in the drawing, each record in the authentication database 44 may be configured from fields relating respectively to a system ID, a user name, a terminal ID, and a token ID. In this embodiment, the password derivation pattern need not be included in the user account information in the authentication database 44. The system ID may be an ID for identifying the usage target system 30 that can be used by each user. The user name may be a user name used in the system assigned to each user. The terminal ID may be a unique device ID assigned to the information communication terminal 20 used by the user during user authentication. A MAC address, for example, may be used as the terminal ID. The token ID may be a unique ID assigned to the security token program installed in the information communication terminal 20 of each user. A different token ID may be used for each usage target system 30.

In this example, a user "ogawa" may be registered as a user who can use the usage target systems 30 indicated respectively by system IDs "36578979" and "36578980". Further, the information communication terminal 20 indicated by the terminal ID "090xxxx1234" may be set as the information communication terminal 20 that is used by the user "ogawa" during user authentication, and the token ID "05:3A:xx:yy:zz:00" may be registered as the software token.

(Description of Information Communication Terminal)

Figure 7A:
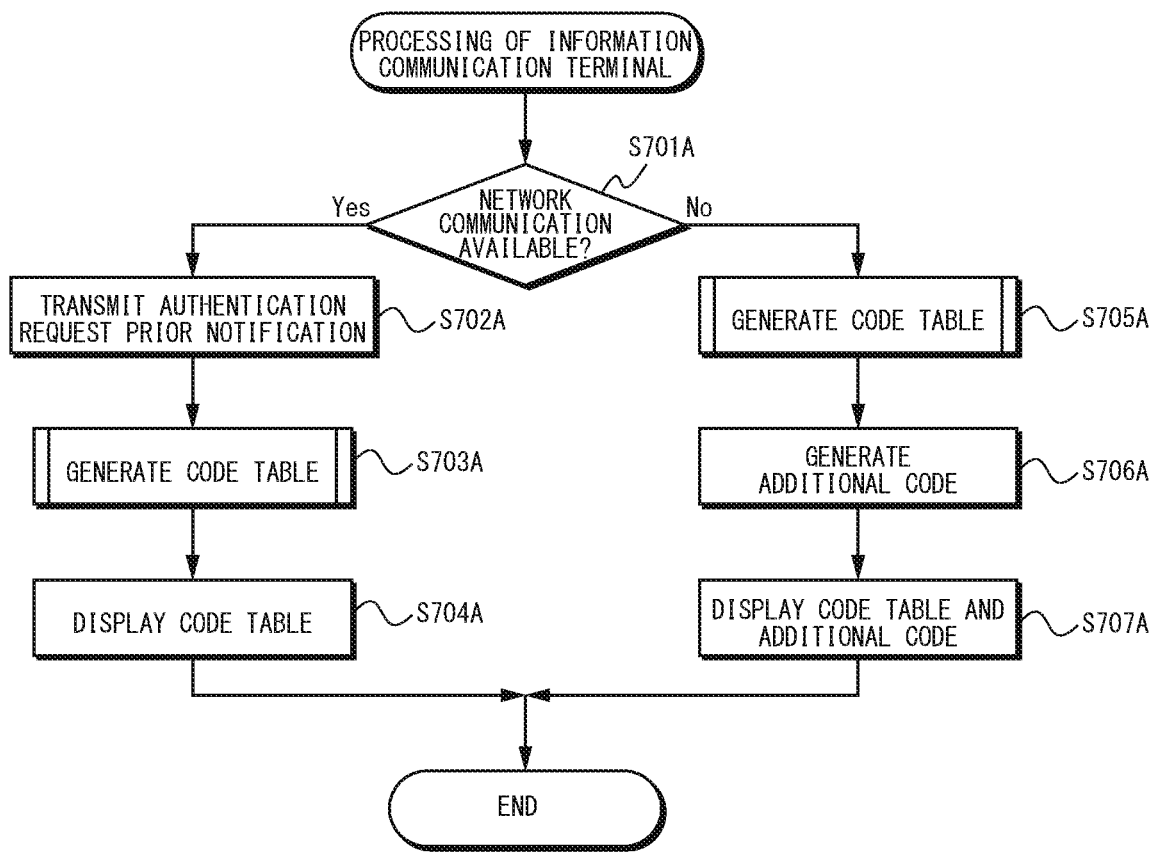
FIG. 7A is a flowchart illustrating processing executed by an information communication terminal in a user authentication method according to an embodiment of the present invention.
Figure 7B:
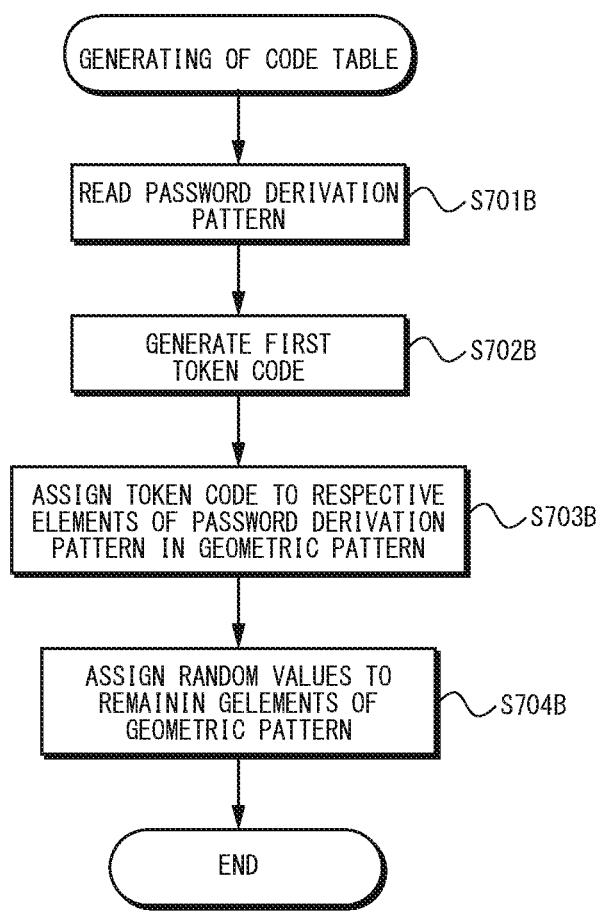
FIG. 7B is a flowchart illustrating processing executed by an information communication terminal in a user authentication method according to an embodiment of the present invention.

FIGS. 7A and 7B are flowcharts illustrating processing executed by the information communication terminal in the user authentication method according to this embodiment of the present invention. This processing may be implemented by, for example, causing the information communication terminal 20 to execute a predetermined application program under the control of a processor. The processing may be executed sequentially or, as long as contradictory processing results are not produced, in a different order, in parallel, or concurrently.

As shown in FIG. 7A, after starting to execute the application program, the information communication terminal 20 may first determine whether or not network communication is possible (S701A). Having determined that network communication is available (Yes in S701A), the information communication terminal 20 may transmit the authentication request prior notification to the authentication server 42 (S702A). The authentication request prior notification may include information (the user name, the terminal ID, and so on) for identifying the user, for example.

Next, the information communication terminal 20 may generate a code table which includes a token code corresponding to the password derivation pattern (S703A). More specifically, as shown in FIG. 7B, the information communication terminal 20 may read the password derivation pattern of the user (S701B), call up the security token program, and generate a first token code which is in synchronization with the token code generated by the synchronization server 46 (S702B). The information communication terminal 20 may next assign the numerals or the like forming the generated first token code to the respective elements forming the password derivation pattern on the code table (the geometric pattern) in order from the start (S703B). Subsequently, the information communication terminal 20 may complete the code table by assigning randomly generated numerals or the like to the remaining elements of the code table (S704B). Having generated the code table, the information communication terminal 20 may then display a reference screen including the generated code table (S704A).

Figure 8:
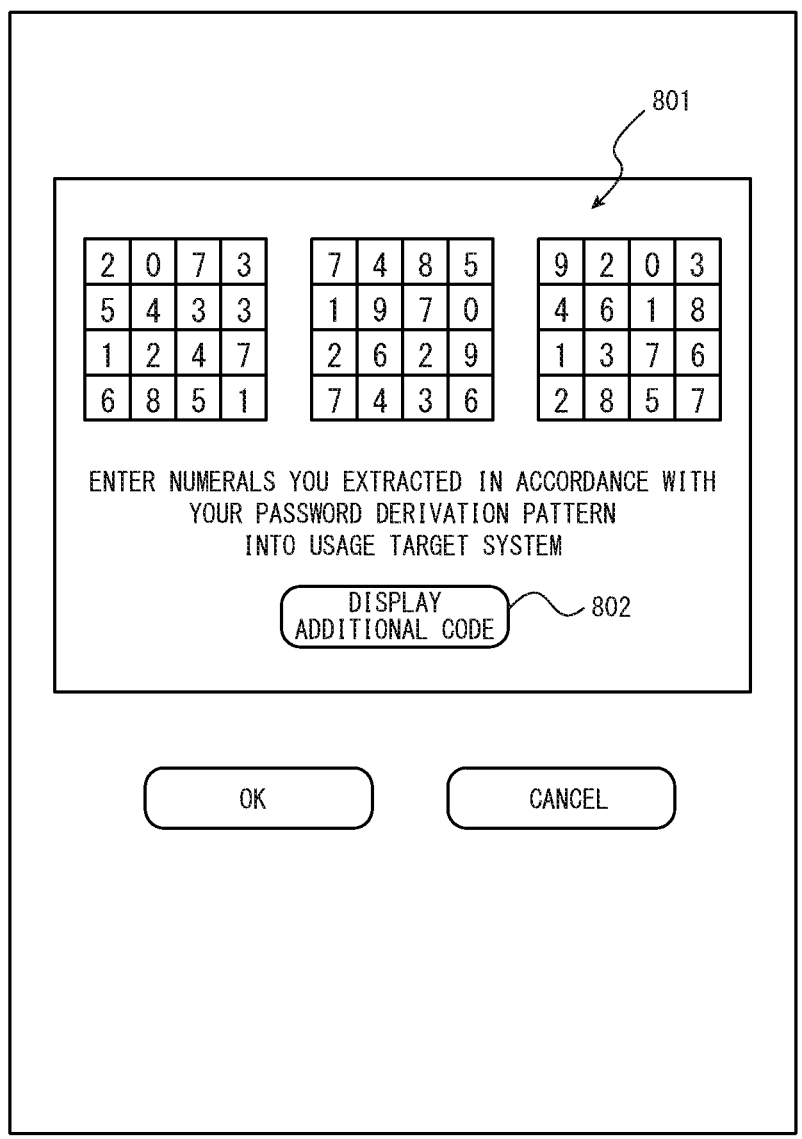
FIG. 8 is a view showing an example of a first reference screen displayed on a user interface of an information communication terminal in a user authentication method according to an embodiment of the present invention.
Figure 10:
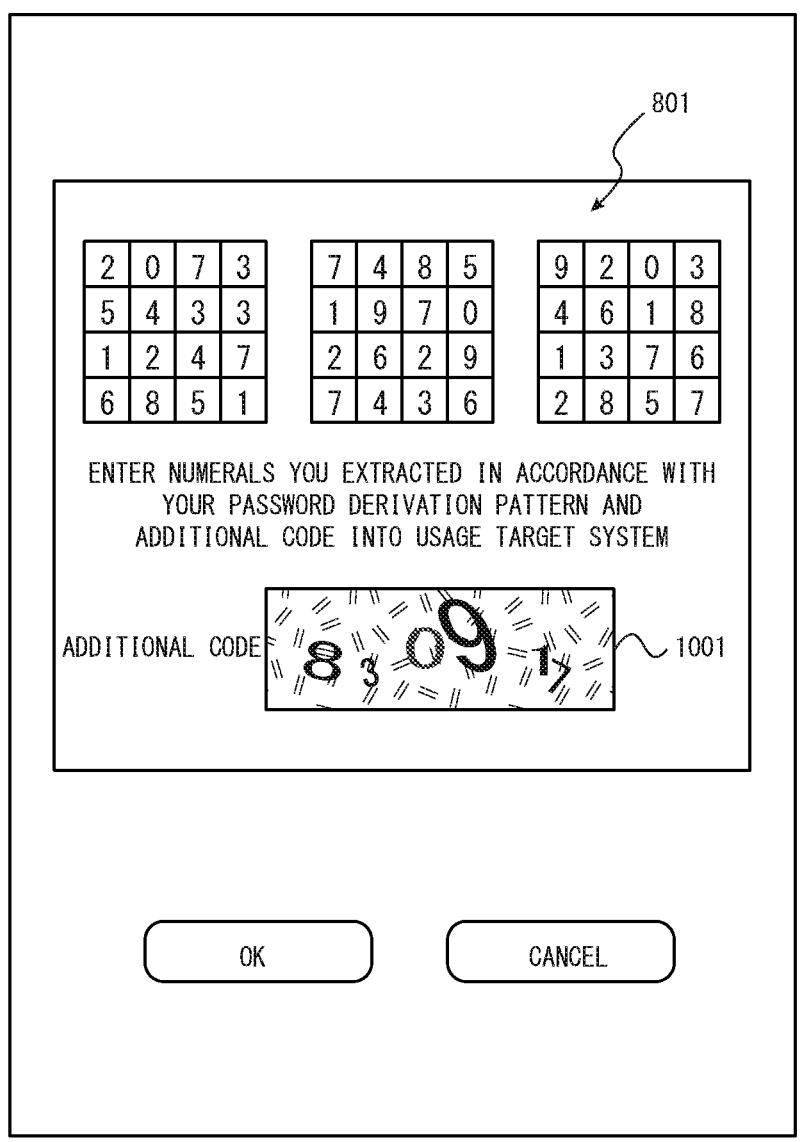
FIG. 10 is a view showing an example of a second reference screen displayed on a user interface of an information communication terminal in a user authentication method according to an embodiment of the present invention.

FIG. 8 is a view showing an example of a first reference screen displayed on the user interface of the information communication terminal 20. As shown in the drawing, the reference screen may be constituted by a code table 801. The code table 801 may be a table on which numerals or the like that appear random at first glance are assigned to respective elements of a geometric pattern, for example. The user may refer to the code table 801 and extract the numerals or the like assigned respectively to the elements corresponding to his/her own password derivation pattern therefrom in order. In this example, the numerals or the like extracted in order may be input into the user interface of the usage target system 30 as a password. In accordance with the password derivation pattern shown in FIG. 3, for example, numerals "5460" may be extracted from the code table 801. The first reference screen may also include an additional code display button 802. For example, if input of the additional code is requested and the user selects the additional code display button 802, the information communication terminal 20 may switch to a second reference screen including the additional code, as shown in FIG. 10.

The user may operate the user interface of the usage target system 30 so as to display a login screen such as that shown in, for example, FIG. 9(*a*) on which to input login information (authentication target information) such as a password. The user may extract the numerals assigned respectively to the elements corresponding to his/her own password derivation pattern by referring to the code table 801 displayed on the user interface of the information communication terminal 20, and input the extracted numerals into a password input field of the login screen. As another example, the user may input the password into the information communication terminal 20 initially, and then input the password into the usage target system 30 by transferring the input password to the usage target system 30 via a short-range communication function. In this example, the information communication terminal 20 is in the communicative condition, and therefore the additional code need not be input. If the password is input into the login screen of the usage target system 30 and a login button, for example, is selected, the user authentication processing may be implemented by the authentication system 40.

It is noted that the usage target system 30 may be configured to inquire the authentication server 42 whether or not the authentication request prior notification has been received at the point where the user operates the user interface, and change the display content of the login screen in accordance with the response. More specifically, if the usage target system 30 receives a response indicating that the authentication request prior notification has been received, the additional code need not be input, and therefore a login screen such as that shown in, for example, FIG. 9(*b*) may be displayed.

Alternatively, the usage target system 30 may display a login screen such as that shown in FIG. 9(*b*) initially, and display a screen requesting input of the additional code if a determination result indicating failed authentication due to the absence of the authentication request prior notification is received following input of the password. In this case, the user may, for example, select the additional code display button 802 on the first reference screen shown in FIG. 8 in order to display the additional code.

Returning to FIG. 7A, having determined that network communication is not available (No in S701A), on the other hand, the information communication terminal 20 may generate the code table including the first token code, as described above (S705A), and also generate the additional code (S706A). The additional code may be a second token code generated separately to the first token code by the security token program so as to be synchronized with the token code generated in the authentication system 40. Having generated the first token code and the additional code, the information communication terminal 20 may display a reference screen including the first token code and additional code on the user interface (S707A).

FIG. 10 is a view showing an example of the second reference screen displayed on the user interface of the information communication terminal 20. As shown in the drawing, the reference screen of the second authentication procedure differs from the reference screen shown in FIG. 8 in that an additional code 1001 is included therein. The additional code 1001 may be represented by numerals or the like (CAPTCHA) within image data that cannot be recognized easily by a computer, for example.

The user may operate the user interface of the usage target system 30 in a similar manner to display the login screen (see FIG. 9(*a*)) on which to input login information (authentication target information) such as a password. The user may extract the numerals assigned respectively to the elements corresponding to his/her own password derivation pattern by referring to the code table 801 displayed on the user interface of the information communication terminal 20, input the extracted numerals into the password input field of the login screen, read the additional code, and input the additional code into an additional code input field of the login screen. As another example, the user may input the password and the additional code into the information communication terminal 20 initially, and then input the password and the additional code into the usage target system 30 by transferring the input password and additional code to the usage target system 30 via a short-range communication function. If the password and additional code are input into the login screen of the usage target system 30 and the login button, for example, is selected, the user authentication processing may be implemented by the authentication system 40.

It is noted that the usage target system 30 may display a login screen such as that shown in FIG. 9(*b*) initially, as described above, and display a screen requesting input of the additional code when a determination result indicating failed authentication due to the absence of the authentication request prior notification is received based on a user authentication request corresponding to input of the password.

Further, in this example, the password derivation pattern is constituted by four elements, but the present invention is not limited thereto, and the password derivation pattern may be constituted by, for example, six elements. Furthermore, a single (a single-digit) numeral is assigned to each element, but the present invention is not limited thereto, and more than one numeral may be assigned. Alternatively, one or more characters may be assigned, and numerals and characters may be intermixed. Moreover, instead of increasing the number of digits (the number of characters) assigned to each element, the number of elements forming the password derivation pattern may be reduced. For example, the information communication terminal 20 may convert the internally generated numerical values (the token code and the random number values) into one or more numerals or characters by referring to a character map, and assign these numerals or characters to the elements.

(Description of Authentication Server)

Figure 11:
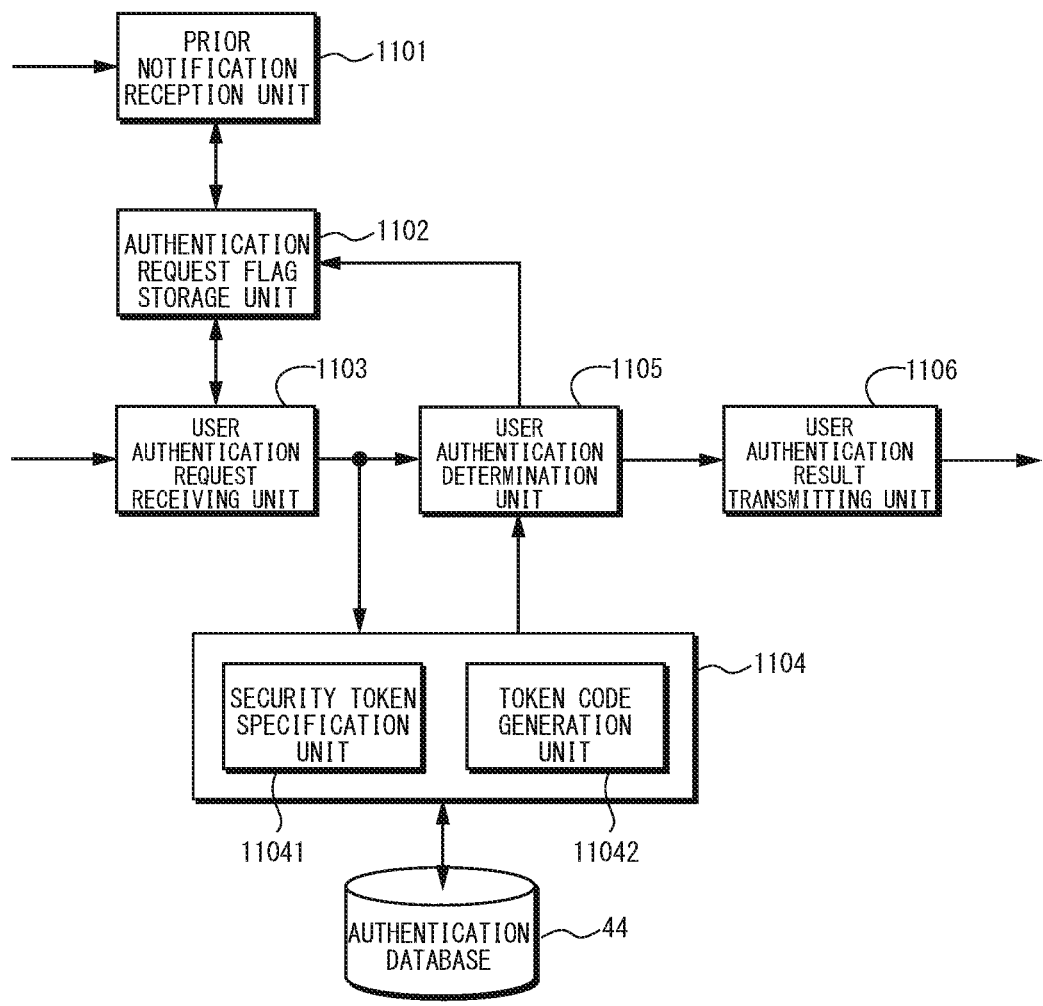
FIG. 11 is a block diagram showing a functional configuration of an authentication system according to an embodiment of the present invention.

Next, a functional configuration of the authentication system 40 according to this embodiment will be described. FIG. 11 is a block diagram showing the functional configuration of the authentication system according to this embodiment of the present invention.

Referring to the drawing, a prior notification receiving unit 1101 may receive the authentication request prior notification from the information communication terminal 20. After receiving the authentication request prior notification from the information communication terminal 20 of a predetermined user, the prior notification receiving unit 1101 may set the value of the authentication request flag of the user, which is stored in an authentication request flag storage unit 1102, at a value indicating that the flag is enabled (e.g., "1"), and start to measure time. The prior notification receiving unit 1101 may monitor the measured time to determine whether or not a predetermined time has elapsed, and when the predetermined time has elapsed, the prior notification receiving unit 1101 may reset the value of the authentication request flag of the user, which is stored in the authentication request flag storage unit 1102, to a value indicating that the flag is disabled (e.g., "0").[0111] A user authentication request receiving unit 1103 may receive the user authentication request including the login information from the usage target system 30, for example. The user authentication request receiving unit 1103 may determine whether or not the received user authentication request includes the additional code, and after determining that the user authentication request includes the additional code, may transmit the login information in the received user authentication request to a security token management unit 1104 and a user authentication determination unit 1105 regardless of the value of the authentication request flag of the user in the authentication request flag storage unit 1102. It is noted that the respective units may be notified of the login information in its entirety, or required parts of the information may be transmitted during the processing of the respective units. After determining that the user authentication request does not include the additional code, on the other hand, the user authentication request receiving unit 1103 may refer to the authentication request flag storage unit 1102 and transmit the login information in the received user authentication request to the security token management unit 1104 and the user authentication determination unit 1105 provided that the value of the authentication request flag of the user indicates that the flag is enabled. If it is determined that the value of the authentication request flag of the user indicates that the flag is disabled, the user authentication request receiving unit 1103 may transmit a message to the user authentication determination unit 1105 indicating that the login information in the received user authentication request and the authentication request are invalid.

The security token management unit 1104 may include, for example, a security token specification unit 11041 and a token code generation unit 11042. The security token specification unit 11041 may refer to the authentication database 44, and transmit the token ID of the security token program installed in the information communication terminal 20 of the user indicated by the login information to the token code generation unit 11042. The token code generation unit 11042 may generate a first token code (a one-time password) which is identical to the token code generated by the security token program identified by the token ID. Here, if the additional code is included in the login information, the token code generation unit 11042 may further generate a second token code corresponding to the additional code. More specifically, using, for example, identical seeds and mathematical algorithms for the security token programs of the respective users, the token code generation unit 11042 may be configured to generate a time-synchronized token code that is identical to the token code generated by the security token program of the corresponding user. A known mathematical algorithm such as a hash function, for example, may be used as the mathematical algorithm. The security token management unit 1104 may transmit the first token code (and the second token code) generated by the token code generation unit 11042 to the user authentication determination unit 1105.

The user authentication determination unit 1105 may perform an authentication determination on the user based on the login information transmitted from the user authentication request receiving unit 1103 and the one or more token codes transmitted from the token code generation unit 11042 of the security token management unit 1104. More specifically, the user authentication determination unit 1105 may compare the password included in the login information with the generated first token code. Further, if the login information includes the additional code, the user authentication determination unit 1105 may compare the additional code with the generated second token code. The user authentication determination unit 1105 may determine that authentication has been performed successfully if it is determined that all of these match, and that authentication has failed when a mismatch occurs. The user authentication determination unit 1105 may transmit the authentication determination result to an authentication determination result transmitting unit 1106. The authentication determination result transmitting unit 1106 may transmit the authentication determination result (or a message indicating that the authentication request is invalid) to the usage target system 30 serving as the source of the user authentication request. Further, once the authentication determination is complete, the user authentication determination unit 1105 may reset the value of the authentication request flag in the authentication request flag storage unit 1102.

It is noted that when the usage target system 30 transmits the password and the additional code at separate timings, the authentication system 40 can manage the condition of a user authentication request associated with a specific user by using information such as a cookie, for example.

Figure 12A:
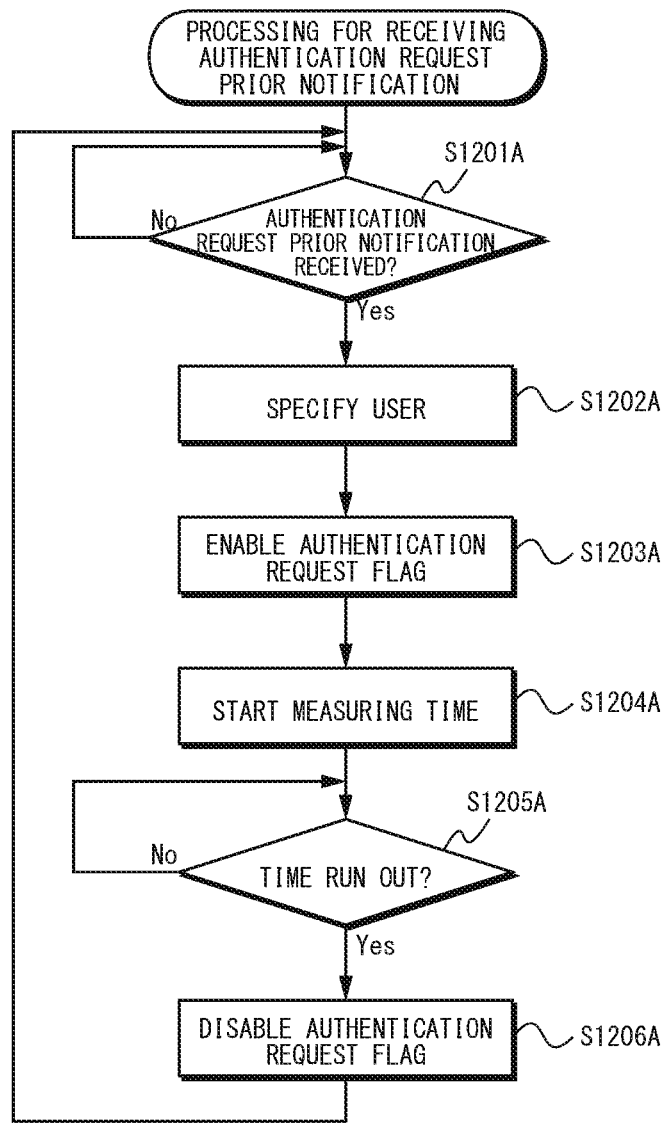
FIG. 12A is a flowchart illustrating a user authentication method according to an embodiment of the present invention.
Figure 12B:
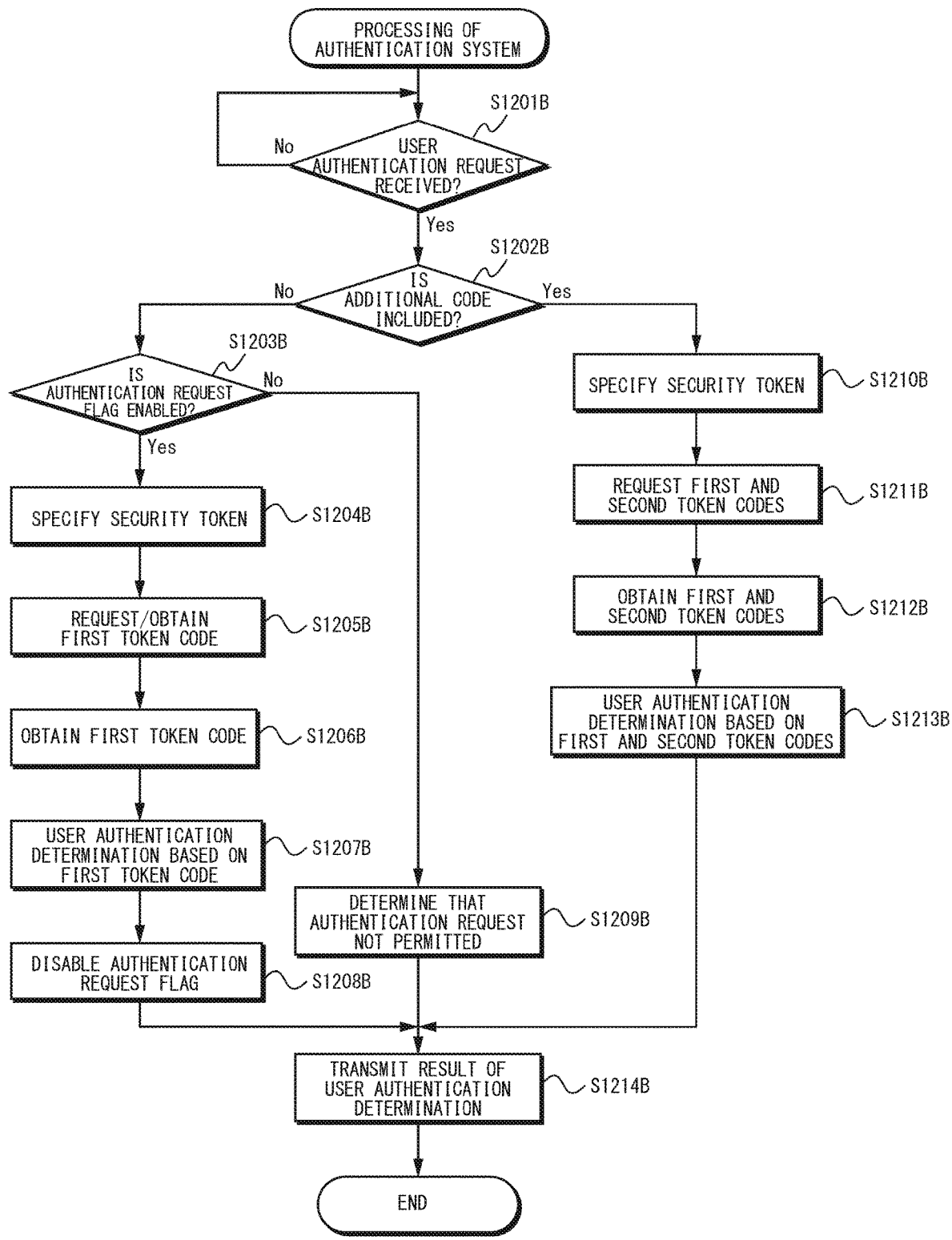
FIG. 12B is a flowchart illustrating a user authentication method according to an embodiment of the present invention.

FIGS. 12A and 12B are flowcharts illustrating the user authentication method according to this embodiment of the present invention. Specifically, FIG. 12A shows processing for receiving the authentication request prior notification in the authentication system 40, and FIG. 12B shows processing executed in the authentication system 40 based on the authentication request. This processing may be implemented by, for example, causing the one or more computing devices constituting the authentication system 40 to execute a predetermined program under the control of a processor. The processing may be executed sequentially or, as long as contradictory processing results are not produced, in a different order, in parallel, or concurrently.

First, as shown in FIG. 12A, the authentication server 42 may perform monitoring via the communication network 10 to determine whether or not the authentication request prior notification has been received (S1201A). After determining that the authentication request prior notification has been received from the information communication terminal 20 (Yes in S1201A), the authentication server 42 may refer to the authentication database 44 to specify the user who transmitted the authentication request prior notification (i.e., the terminal ID of the information communication terminal 20 of the user) (S1202A). Next, the authentication server 42 may rewrite the value of the authentication request flag associated with the specified user to the value indicating that the flag is enabled (S1203A), and start to measure time (S1204A). The authentication server 42 may monitor the measured time to determine whether or not a predetermined time has elapsed (S1205A). The purpose of this is to determine whether or not a following user authentication request has arrived within the predetermined time. After determining that the measured time has reached the predetermined time (Yes in S1205A), the authentication server 42 may rewrite the value of the authentication request flag to the value indicating that the flag is disabled (S1206A), and return to monitoring for determining whether or not the authentication request prior notification has been received.

Further, as shown in FIG. 12B, the authentication server 42 may perform monitoring via the communication network 10 to determine whether or not a user authentication request including the login information has been received (S1201B). After determining that a user authentication request has been received from the usage target system 30 (Yes in S1201B), for example, the authentication server 42 may check whether or not the user authentication request includes the additional code (S1202B). In other words, in this example, the authentication server 42 may determine whether to perform the first user authentication procedure or the second user authentication procedure depending on the presence or absence of the additional code in the user authentication request.

If the authentication server 42 determines that the user authentication request does not include the additional code (No in S1202B), the authentication server 42 may then check whether or not the value of the authentication request flag associated with the user on the basis of the user authentication request indicates that the flag is enabled (S1203B). After determining that the value of the authentication request flag indicates that the flag is enabled (Yes in S1203B), the authentication server 42 may refer to the authentication database 44 to specify the security token program (i.e., the token ID) installed in the information communication terminal 20 of the user (S1204B). Next, the authentication server 42 may request a token code that is identical to and synchronized with the specified security token program from the synchronization server 46 using the token ID (S1205B). Having received the request, the synchronization server 46 may specify the seed of the user from the token ID, generate a first token code that is identical to and in synchronization with the security token program of the information communication terminal 20 using a predetermined password generation algorithm, and return the generated first token code to the authentication server 42. By way of this, the authentication server 42 may obtain a first token code that is identical to and corresponds to the first token code generated by the security token 22 held by the user (S1206B).

The authentication server 42 may next perform an authentication determination on the user based on the password included in the login information transmitted from the usage target system 30 and the obtained first token code (S1207B). The authentication server 42 may determine that authentication has been performed successfully if the password included in the login information and the obtained first token code match, and may determine that authentication has failed if the password and the first token code do not match. Subsequently, the authentication server 42 may rewrite the value of the authentication request flag associated with the user to the value indicating that the flag is disabled (S1208B), whereupon the authentication server 42 may transmit the authentication determination result to the usage target system 30 serving as the source of the user authentication request (S1214B).

Having determined that the value of the authentication request flag indicates that the flag is disabled (No in S1203B), on the other hand, the authentication server 42 may determine either that the authentication request prior notification has not been received or that the authentication request prior notification has been received but time has run out, and may therefore determine that the user authentication request is invalid (S1209B). The authentication server 42 may then transmit the determination result to the usage target system 30 serving as the source of the user authentication request (S1214B).

After determining that the user authentication request includes the additional code (Yes in S1202B), in contrast, the authentication server 42 may specify the security token program installed in the information communication terminal 20 of the user by referring to the authentication database 44 (S1210B). Subsequently, the authentication server 42 may request a set including first and second token codes that are identical to and in synchronization with the specified security token program from the synchronization server 46 using the token ID (S1211B). Upon reception of the request, the synchronization server 46 may specify the seed of the user from the token ID, generate a set of token codes that are identical to and in synchronization with the security token program of the information communication terminal 20, or, namely, a set of the first token code and the second token code, using a predetermined password generation algorithm, and return the generated set of the first and second token codes to the authentication server 42. By way of this, the authentication server 42 may obtain a set of the first and second token codes that corresponds to a set of the first token code and the additional code generated by the security token 22 held by the user (S1212B).

Next, the authentication server 42 may perform an authentication determination on the user based on the set of the password and the additional code included in the login information transmitted from the usage target system 30 and the obtained set of the first and second token codes (S1213B). The authentication server 42 may determine that authentication has been performed successfully if the password included in the login information and the obtained first token code match and the additional code included in the login information and the obtained second token code match, and may determine that authentication has failed if at least one mismatch occurs. The authentication server 42 may then transmit the authentication determination result to the usage target system 30 serving as the source of the user authentication request (S1214B).

It is noted that in a configuration where the usage target system 30 transmits the password and the additional code in stages, the authentication server 42 may be applied as follows, for example. That is, if the information communication terminal 20 is not in the communicative condition and the first user authentication request not including the additional code is received from the information communication terminal 20, the authentication server 42 may determine that authentication is not permitted, but may temporarily hold the password extracted therefrom. Then, if the authentication server 42 may receive, for example, the second user authentication request including the additional code within the predetermined time, the authentication server 42 may perform the user authentication determination by executing the processing of step S1209B as described above.

(Advantages etc.)

According to this embodiment, as described above, it is possible to switch selectively to an appropriate user authentication procedure in accordance with the communication environment in which the user is located. More specifically, if the information communication terminal is in the communicative condition, the information communication terminal may transmit an authentication request prior notification to the authentication system before implementing password-based user authentication, and the authentication system may perform a user authentication based on a password transmitted from the usage target system on condition that the authentication request prior notification has been received. On the other hand, if the information communication terminal 20 is not in the communicative condition, the authentication system may perform a user authentication based on a password and an additional code transmitted from the usage target system. As a result, a sufficient level of security against external attacks can be secured in both communication environments.

According to this embodiment in particular, authentication permission may be determined using the authentication request prior notification, and therefore an extremely high security effect can be expected in response to a so-called replay attack. Moreover, even when the authentication request prior notification cannot be used, the additional code may be used, and therefore a security effect exhibiting sufficient practicality can be expected.

Furthermore, according to this embodiment, a code table on which a token code generated by a security token is assigned to elements forming a password derivation pattern may be used, and when the authentication request prior notification cannot be used, an additional code may be generated by the security token. As a result, an even higher security effect can be expected.

[Second Embodiment]

This embodiment may be a modification of the above embodiment, and relate to a user authentication method and a system for implementing this method, in which the functions provided in the authentication server in relation to authentication based on the authentication request prior notification may be implemented on a computer provided separately to the authentication server.

Figure 13:
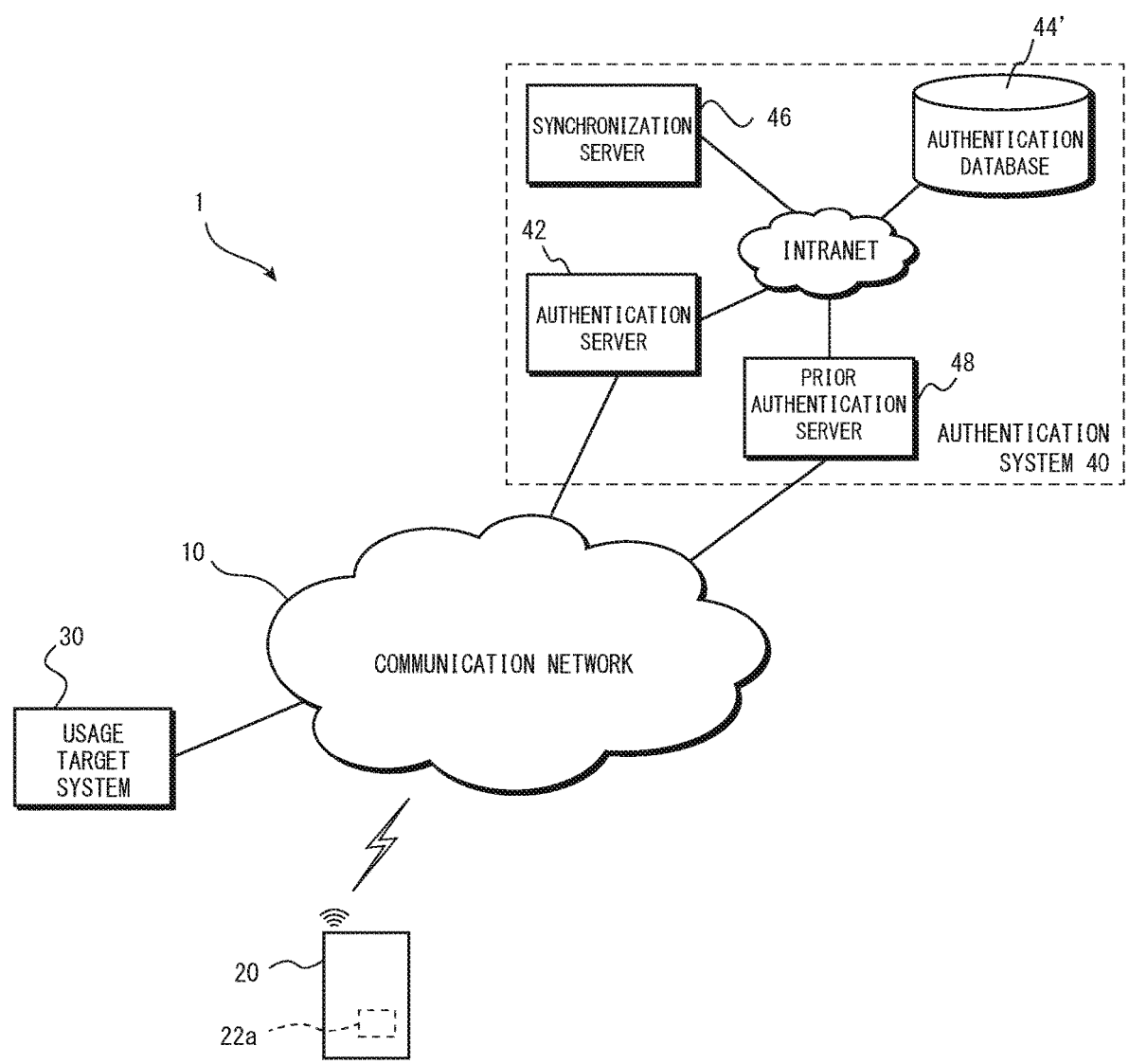
FIG. 13 is a schematic view showing an example configuration of a computer system for implementing a user authentication method according to an embodiment of the present invention.

FIG. 13 is a schematic view showing an example configuration of a computer system for implementing the user authentication method according to this embodiment of the present invention. As shown in the drawing, in this embodiment, the computer system 1 may further include a prior authentication server 48 that is connected to the communication network 10 independently of the authentication server 42. In this embodiment, therefore, the information communication terminal 20 may transmit the authentication request prior notification to the prior authentication server 38 when in the communicative condition.

The prior authentication server 48 may be a server computer which implements prior authentication processing based on the authentication request prior notification in cooperation with the authentication server 42. The prior authentication server 48 may be configured to include, for example, an authentication request flag storage unit (not shown), and may manage the presence or absence of a prior notification in accordance with the authentication request flag associated with a user. After receiving an authentication request prior notification transmitted from the information communication terminal 20 of the user, the prior authentication server 48 may rewrite the value of the authentication request flag associated with the user to a value indicating that the flag is enabled, and, upon of completion of the user authentication processing by the authentication server 42, the prior authentication server 48 may reset the value of the authentication request flag associated with the user.

If the authentication server 42 receives a user authentication request not including the additional code, the authentication server 42 may then issue a request to the prior authentication server 48. In response to this, the prior authentication server 48 may refer to the authentication request flag storage unit, and return a determination result indicating whether or not the user authentication request is valid to the authentication server 42 in accordance with the value of the corresponding authentication request flag.

It is noted that in this embodiment, the prior authentication server 48 is provided in the authentication system 40, but the present invention is not limited thereto, and the prior authentication server 48 may be provided independently of the authentication system 40. In this case, the prior authentication server 48 may communicate with the authentication system 40 via, for example, the communication network 10. Alternatively, as will be described below, the functions provided by the prior authentication server 48 may be packaged in the information communication terminal 20.

According to this embodiment, as described above, similar advantages to the above embodiment can be obtained. According to this embodiment in particular, the prior authentication server can be disposed more freely, and as a result, the system can be operated more flexibly.

[Third Embodiment]

This embodiment may be a modification of the first and/or second embodiment, and relate to a user authentication method and a system for implementing this method, in which the authentication system may store authentication history information of a successfully authenticated user in a database using the authentication request prior notification.

Figure 14:
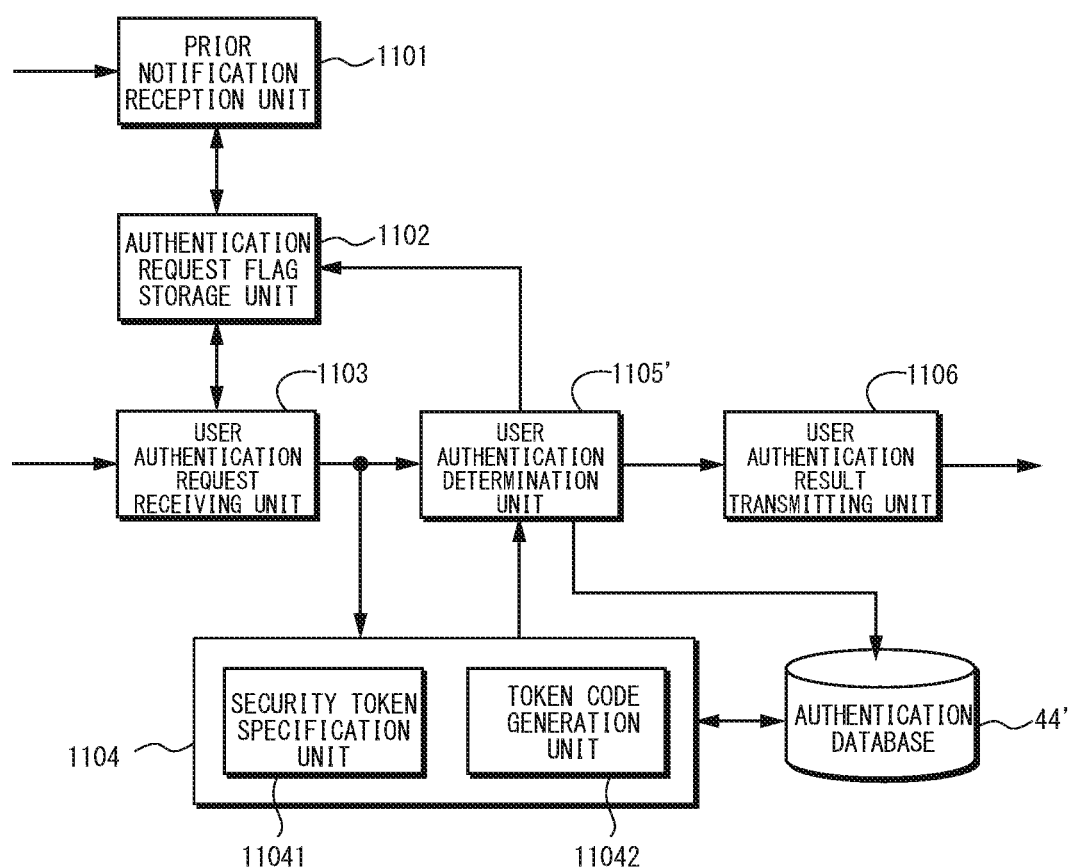
FIG. 14 is a block diagram showing a functional configuration of an authentication system according to an embodiment of the present invention.

FIG. 14 is a block diagram showing a functional configuration of an authentication system according to this embodiment of the present invention. In this embodiment, as shown in the drawing, a user authentication determination unit 1105' may be configured to be capable of storing an authentication result based on the first user authentication procedure (an authentication result using the authentication request prior notification) in an authentication database 44'. All other constituent elements are the same as those shown in FIG. 11, and description thereof will be omitted as appropriate.

The user authentication request receiving unit 1103 may refer to the authentication request flag storage unit 1102 after determining that the user authentication request transmitted from the usage target system 30 does not include the additional code, and if the value of the authentication request flag of the user indicates that the flag is enabled, the user authentication receiving unit 1103 may transmit the login information contained in the received user authentication request to the security token management unit 1104 and the user authentication determination unit 1105'. At this time, the user authentication request receiving unit 1103 may also transmit the value of the authentication request flag to the user authentication determination unit 1105'.

Figure 15:
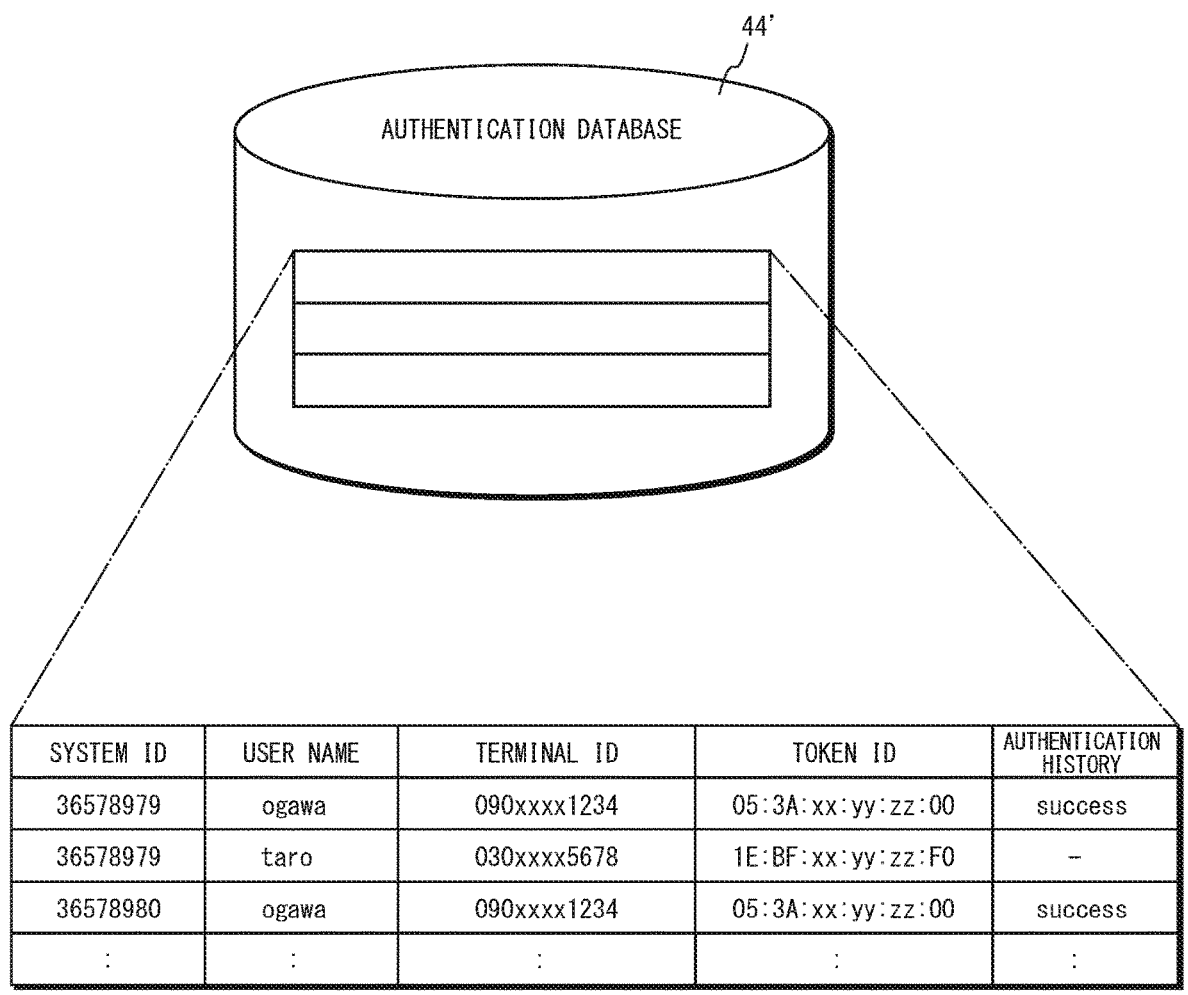
FIG. 15 is a view showing another example of a data structure of an authentication database used in a user authentication method according to an embodiment of the present invention.

As described above, the user authentication determination unit 1105' may perform an authentication determination on the user based on the login information transmitted from the user authentication request receiving unit 1103 and the one or more token codes transmitted from the token code generation unit 11042 of the security token management unit 1104. The user authentication determination unit 1105', in a case of having received the value of the authentication request flag and determined that authentication has been performed successfully, may register user history information indicating that authentication has been performed successfully based on the authentication request prior notification in the authentication database 44', as shown in, for example, FIG. 15, for example. In the drawing, "success" in an authentication history field may indicate that authentication has been performed successfully based on the authentication request prior notification.

It is noted that in this embodiment, the authentication history information is registered in relation to cases where authentication is performed successfully based on the first user authentication procedure, but the present invention is not limited thereto, and instead, information indicating the user authentication procedure on which the authentication result is based may be recorded as the authentication history information. Further, the authentication history information is not limited to the most recent information, and may be accumulated in time series.

According to this embodiment, as described above, similar advantages to the above embodiments can be obtained. According to, among others, this embodiment, the authentication system may store the authentication history information of a successfully authenticated user in a database using the authentication request prior notification, and as a result, the authentication history information can be provided.

(Example Application)

Figure 16:
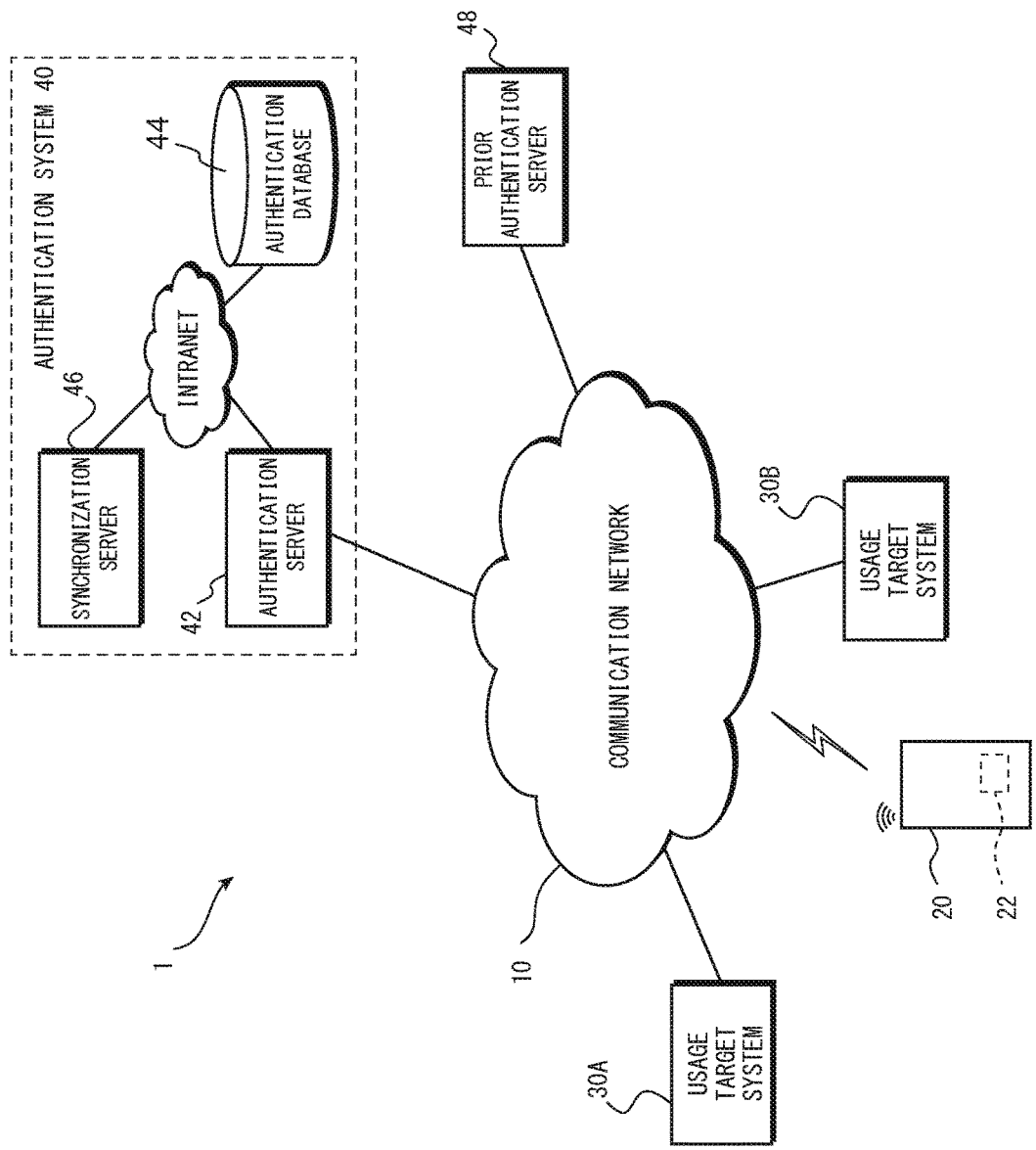
FIG. 16 is a schematic view showing an example of a configuration of a computer system in order to illustrate an example application of a user authentication method according to an embodiment of the present invention.

FIG. 16 is a schematic view showing a configuration of a computer system in order to illustrate an example application of a user authentication method according to an embodiment of the present invention. In this example, it may be assumed that usage target systems 30A and 30B correspond respectively to a site A and a site B that provide predetermined services. The user may typically use the services of the usage target systems 30A and 30B via a browser packaged in his/her personal computer.

The usage target system 30A requests authentication based on the user authentication method described above, while the usage target system 30B requests history information relating to successful authentication with (successful login to) the usage target system 30A in addition to authentication based on the user authentication method. More specifically, for example, the usage target system 30B may provide all of the services of the usage target system 30A and/or an additional service (e.g., a courtesy service) only to a user who has logged into the usage target system 30A successfully in the past. It is noted that authentication by the usage target system 30B may be implemented such that a user who has logged into the usage target system 30A successfully in the past and has transmitted the authentication request prior notification, for example, is determined to have been successfully authenticated.

To achieve this function, the authentication system 40 may hold a profile (not shown) defining the usage target systems 30 that request the authentication history information. The profile may describe, for example, the successful authentication history information about which usage target system 30 when authentication is required. The authentication server 42, in a case of having received a user authentication request relating to a usage target system 30 (in this example, the usage target system 30B) that requests the authentication history information, may refer to the authentication database 44' and transmit the authentication history information to the usage target system 30 together with the authentication determination result obtained in accordance with the user authentication method described above. By way of this, the usage target system 30 can determine the content of the services to be provided to the user based on the authentication history information when authentication is performed successfully.

As described above, when the user uses a certain usage target system, an authentication history relating to another usage target system may be requested. By way of this, the sites can be operated such that users who can use site B are limited to members of site A, for example. Alternatively, the sites can be operated such that users who have logged into site A can received courtesy services provided by site B.

[Fourth Embodiment]

This embodiment may be a modification of the above embodiments, and relate to a user authentication method and a system for implementing this method, in which an information communication terminal installed with a part of the functions relating to prior authentication may be used.

More specifically, the information communication terminal 20 according to this embodiment may, for example, hold the value of the authentication request flag and provide the authentication server 42 with the value in response to a request therefrom instead of transmitting an authentication request prior notification to the authentication server 42. As described above, the authentication server 42, upon reception of a user authentication request from the usage target system 30, may attempt to obtain the value of the authentication request flag from the corresponding information communication terminal 20, and having successfully obtained the value of the authentication request flag (i.e. the value indicating that the flag is enabled) from the information communication terminal 20, may use the obtained value to perform the user authentication processing. When, on the other hand, the authentication server 42 cannot obtain the value of the authentication request flag from the information communication terminal 20 or the obtained value indicates that the flag is disabled, the authentication server 42 may perform the user authentication processing using the additional code. Having successfully obtained the value of the authentication request flag from the information communication terminal 20, the authentication server 42 may notify the usage target system 30 thereof.

Further, the authentication server 42 and/or the usage target system 30 may make use of the fact that the information communication terminal 20 is in the communicative condition to provide predetermined information or issue instructions to the information communication terminal 20.

For example, the user may use a site (Internet banking) provided by a financial institution via a web browser or the like. It may be assumed that the user logs in to the site, which serves as the usage target system 30, using the information communication terminal 20, which is in the communicative condition. Following login, the user may, for example, request a transfer procedure, and the site may notify the information communication terminal 20 of encoded transfer information. Upon reception of this notification, the information communication terminal 20 may display the transfer information on the user interface so that the user can confirm that the transfer procedure has been completed.

According to this embodiment, as described above, similar advantages to the above embodiments can be obtained. According to this embodiment in particular, establishment of a communication session between the information communication terminal and the authentication system may be confirmed, and as a result, the authentication system can provide the information communication terminal with various types of information and/or issue various instructions thereto.

[Fifth Embodiment]

This embodiment may be a modification of the above embodiments, and relate to a user authentication method and a system for implementing this method, in which a password derivation pattern registered on the authentication system side may be used. More specifically, in this embodiment, the information communication terminal, in a case of the communicative condition, may transmit the authentication request prior notification to the authentication system and display a code table formed by assigning a token code generated so as to be in time-synchronization with the authentication system to respective elements of a geometric pattern on the user interface. The user may extract numerals or the like assigned respectively to elements corresponding to his/her own password derivation pattern by referring to the displayed code table, and input the extracted numerals or the like into the usage target system as a password. The authentication system may perform an authentication determination on the input password based on an identical code table (i.e., a token code) generated in time-synchronization with the information communication terminal and transmitted from the usage target system, and the password derivation pattern of the user, which has been registered in advance. It is noted that if the information communication terminal is not in the communicative condition, the information communication terminal displays the additional code on the user interface together with the aforesaid code table.

As described above, this embodiment differs from the first embodiment, in that numerals or the like that are in time-synchronization with the authentication system may be assigned to all of the elements of the code table, and the password derivation pattern may be registered in the authentication system. Accordingly, the information communication terminal may not need to hold the password derivation pattern. In the following description, parts that are the same as the above embodiments will be omitted as appropriate.

Figure 17:
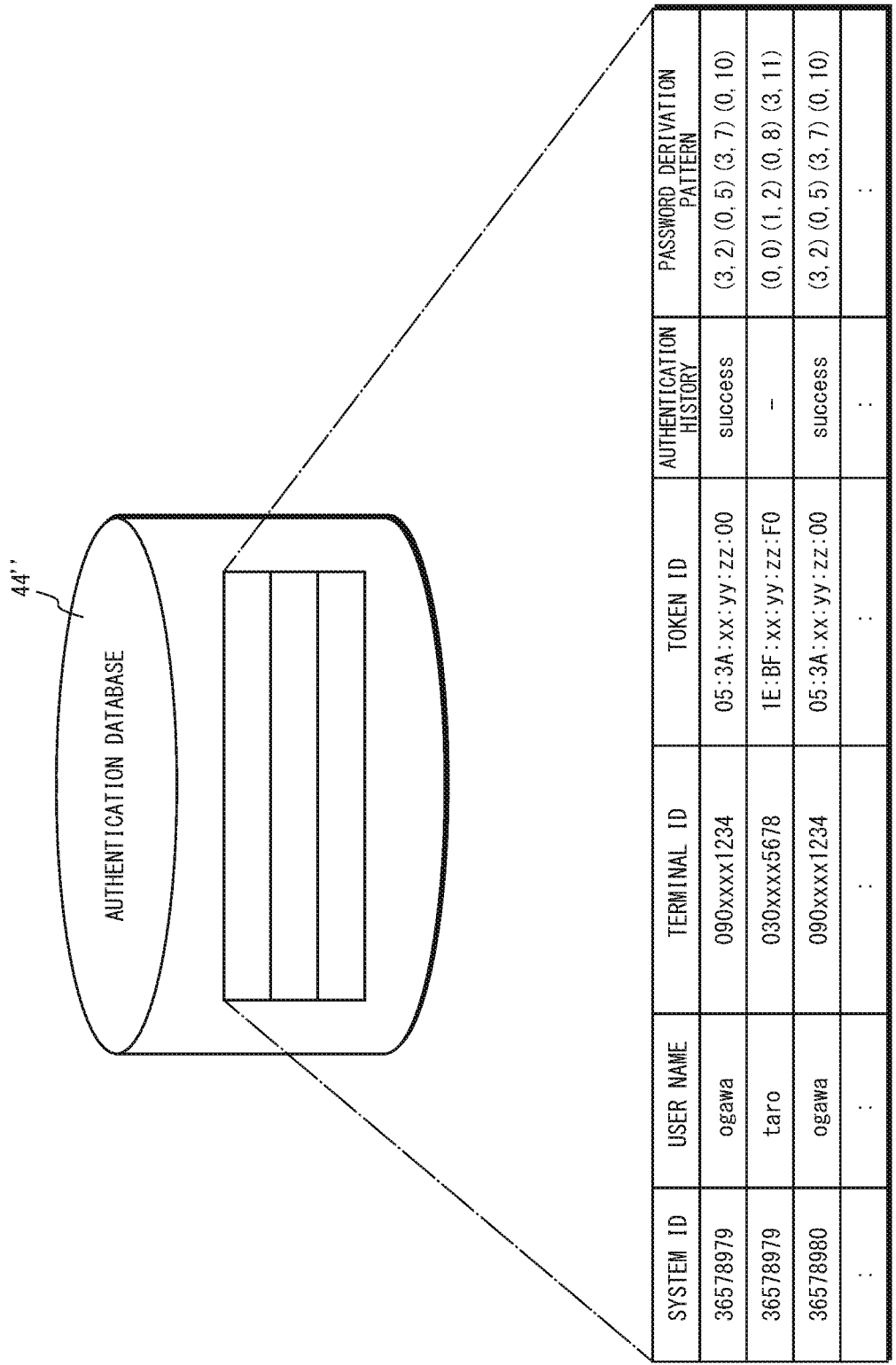
FIG. 17 is a view showing another example of a data structure of an authentication database used in a user authentication method according to an embodiment of the present invention.

FIG. 17 is a view showing an example of a data structure of an authentication database used in the user authentication method according to this embodiment of the present invention. As shown in the drawing, an authentication database 44" according to this embodiment may be a database which manages user account information which is registered in advance by individual users and required for user authentication. As the user account information, the authentication database 44" may manage, for example, information relating to users who can use the usage target system 30, information relating to the security token of each user, and information relating to a password derivation rule. As described above, before using the usage target system 30 which requests user authentication, the user may first perform user registration with the usage target system 30 and set the software token 22. In this embodiment, user registration may include registering a password derivation pattern in the authentication database 44". For example, the user may register his/her own user account information for the usage target system 30 in the authentication database 44" of the authentication system 40 in advance by way of using the information communication terminal 20.

To use the usage target system 30, the user may activate a corresponding application program by operating the information communication terminal 20. The information communication terminal 20 may display a reference screen including the code table and, depending on the communication condition, the additional code in accordance with the execution of the application program. In this embodiment, the token code generated by the security token program of the information communication terminal 20 may be assigned to all of the elements of the code table.

The user may extract the numerals or the like assigned respectively to the elements forming his/her own password derivation pattern in order from the displayed code table, and input the extracted numerals or the like into the user interface of the usage target system 30 as a password. In response, as described above, the usage target system 30 may transmit a user authentication request including login information such as the password (and the additional code) to the authentication server 42.

Upon reception of the user authentication request, the authentication server 42 may specify the password derivation pattern of the user and the token ID by referring to the authentication database 44". Subsequently, the authentication server 42 may request a token code which is identical to and in time-synchronization with the security token of the user from the synchronization server 46 based on the token ID, and thereby obtain from the synchronization server 46 a token code for forming the code table of the user. The authentication server 42 may next specify the password by extracting the numerals or the like from the corresponding elements in accordance with the password derivation pattern of the user, perform an authentication determination by comparing the specified password with the password transmitted from the user, and then transmit the authentication determination result to the usage target system 30.

In response to this, the usage target system 30 may return the authentication determination result to the user and perform subsequent processing in accordance with the authentication determination result. For example, if the authentication determination result indicates failed authentication, the user may be notified that login has failed, whereas if the authentication determination result indicates successful authentication, login may be accepted and the user may, for example, be provided with a predetermined processing result or receive a service.

According to this embodiment, as described above, similar advantages to the above embodiments can be obtained. According to this embodiment in particular, the authentication system may manage the password derivation pattern and the security token, and, therefore, user authentication can be carried out using the password derivation pattern without the need to hold the password derivation pattern in the information communication terminal.

The above embodiments are examples for describing the present invention, and the present invention is not limited only to these embodiments. The present invention can be carried out in various modes without departing from the spirit thereof.

For example, the steps, operations, or functions of the methods disclosed in the present description may be executed in parallel or in a different order as long as contradictory results are not produced. The described steps, operations, and functions are provided merely as examples, and some of the steps, operations, and functions can be omitted without departing from the spirit of the invention. Further, the described steps, operations, and functions may be joined into a single step, operation, or function, and other steps, operations, or functions may be added.

Moreover, various embodiments are disclosed in this description, but a specific feature (a technical matter) in one embodiment may be appropriately improved and added to another embodiment or replaced with a specific feature in another embodiment, and the resulting embodiment is also included within the spirit of the present invention.

INDUSTRIAL APPLICABILITY

The present invention can be widely used in the field of user authentication techniques for computer systems.

REFERENCE SIGNS LIST

1 Computer system
10 Communication network
12 Carrier network
14 Computer network
16 Gateway
20 Information communication terminal
30 Usage target system
40 Authentication system
42 Authentication server
44 Authentication database
46 Synchronization server
48 Prior authentication server
1101 Prior notification receiving unit
1102 Authentication request flag storage unit
1103 User authentication request receiving unit
1104 Security token management unit
11041 Security token specification unit
11042 Token code generation unit
1105 User authentication determination unit
1106 User authentication result transmitting unit

The invention claimed is:

1. An authentication system for authenticating, by way of using an information communication terminal, a user who uses a usage target system, comprising:
an authentication database that manages user account information for each user, the user account information including a token ID for identifying a security token of the corresponding user;
a synchronization server that generates at least one token code based on the token ID included in the user account information; and
an authentication server that receives a user authentication request transmitted from the usage target system, performs an authentication determination on the user authentication request, and transmits an authentication determination result to the usage target system,
wherein, if the authentication server receives an authentication request prior notification from the information communication terminal being in a communicative condition, before receiving the user authentication request, the authentication server performs the authentication determination on the user authentication request based on comparison of a first token code generated by the synchronization server with a password included in the user authentication request, and
wherein, if the authentication server receives the user authentication request without receiving the authentication request prior notification, the authentication server performs the authentication determination on the user authentication request based on comparison of a set of at least the first token code and a second token code generated by the synchronization server with a set of a password and an additional code included in the user authentication request.

2. The authentication system according to claim 1, wherein, if the authentication server receives the authentication request prior notification from the information communication terminal of a user, the authentication server performs control to set an authentication request flag associated with the user at a value indicating that the authentication request flag is enabled, and
if the value of the authentication request flag indicates that the authentication request flag is enabled, the authentication server performs the authentication determination on the user authentication request by comparing a password included in the user authentication request with the first token code.

3. The authentication system according to claim 2, wherein the authentication server resets the value of the authentication request flag to a value indicating that the authentication request flag is disabled when a predetermined time elapses following reception of the authentication request prior notification.

4. The authentication system according to claim 2, wherein, if the user authentication request does not include an additional code and the value of the authentication request flag indicates that the authentication request flag is disabled, the authentication server transmits an authentication determination result indicating that the user authentication request is not permitted to the usage target system.

5. The authentication system according to claim 1, wherein the authentication server performs control to register the authentication determination result in the authentication database as authentication history information, and
wherein the authentication database manages the authentication history information for each user.

6. The authentication system according to claim 1, wherein the authentication database manages a password derivation pattern for each user, the password derivation pattern being constituted by specific elements selected from a plurality of elements forming a geometric pattern.

7. An information communication terminal used in authentication by an authentication system that authenticates a user who uses a usage target system, comprising:
a memory configured to store a password derivation pattern constituted by specific elements selected from a plurality of elements forming a geometric pattern;
a communication module configured to transmit an authentication request prior notification to the authentication system; and
a processor configured to
obtain at least one token code that is in synchronization with at least one token code generated by the authentication system from a security token of the user;
generate a code table by assigning a first token code obtained to the specific elements forming the password derivation pattern within the geometric pattern, and assign an arbitrary code to remaining elements of the geometric pattern;

generate an additional code based on a second token code obtained; and display a reference screen on a user interface, wherein, in a communicative condition, the processor displays the reference screen on the user interface so as to include the code table generated, and the communication module transmits the authentication request prior notification to the authentication system, so that if an authentication server of the authentication system receives the authentication request prior notification from the information communication terminal being in the communicative condition, before receiving the authentication request, the authentication server performs an authentication determination on the authentication request based on comparison of the first token code generated by a synchronization server of the authentication system with a password included in the authentication request, and if the authentication server receives the authentication request without receiving the authentication request prior notification, the authentication server performs the authentication determination on the authentication request based on comparison of a set of at least the first token code and the second token code generated by the synchronization server with a set of a password and an additional code included in the authentication request, and in a non-communicative condition, the processor displays the reference screen on the user interface so as to include the code table generated and the additional code generated.

8. The information communication terminal according to claim 7, wherein, if the information communication terminal is in the communicative condition, the processor displays the reference screen on the user interface so as to also include the additional code generated.

9. An authentication system for authenticating, by way of using an information communication terminal, a user who uses a usage target system, comprising:

an authentication database that manages user account information for each user, the user account information including a token ID for identifying a security token of the corresponding user;

a synchronization server that generates at least one token code based on the token ID included in the user account information;

a prior authentication server that receives an authentication request prior notification transmitted from the information communication terminal of a user, and manages a prior notification condition of the user based on the authentication request prior notification; and an authentication server which, upon reception of a user authentication request transmitted from the usage target system, performs an authentication determination on the user authentication request in accordance with an authentication request state of the user, which is managed by the prior authentication server, and transmits an authentication determination result to the usage target system, wherein, if the prior notification condition of the user is active, the authentication server performs the authentication determination on the user authentication request based on comparison of a first token code generated by the synchronization server with a password included in the user authentication request, and wherein, if the user authentication request is received while the prior notification condition of the user is inactive, the authentication server performs the authentication determination on the user authentication request based on comparison of a set of the first token code and a second token code generated by the synchronization server with a set of a password and an additional code included in the user authentication request.

10. An authentication system for authenticating, by way of using an information communication terminal, a user who uses a usage target system, comprising:

an authentication database that manages user account information for each user, the user account information including a token ID for identifying a security token of the corresponding user;

a synchronization server that generates at least one token code based on the token ID included in the user account information;

a prior authentication server that receives an authentication request prior notification transmitted from the information communication terminal of a user, and manages a prior notification condition of the user based on the authentication request prior notification; and an authentication server that receives a user authentication request transmitted from the usage target system, performs an authentication determination on the user authentication request based on the at least one token code, and transmits an authentication determination result to the usage target system, wherein the authentication server performs control to register the authentication determination result in the authentication database as authentication history information, and wherein, if the authentication determination result registered in the authentication database indicates successful authentication to a first usage target system, the authentication server makes, based on the at least one token code, an authentication determination on a user authentication request transmitted from a second usage target system.

11. A user authentication method executed by an authentication system in order to authenticate a user who uses a usage target system, comprising:

managing user account information for each user, the user account information including a token ID for identifying a security token of the corresponding user;

generating at least one token code based on the token ID included in the user account information;

receiving a user authentication request transmitted from the usage target system and performing an authentication determination on the user authentication request; and transmitting an authentication determination result to the usage target system, wherein the authentication determination includes, if an authentication request prior notification, which is transmitted while an information communication terminal of the user is in a communicative condition, is received before receiving the user authentication request, performing authentication determination on the user authentication request based on comparison of a first token code with a password included in the user authentication request, and wherein the authentication determination includes, if the user authentication request is received without receiving the authentication request prior notification, performing authentication determination on the user authentication request based on comparison of a set of the first token code and a second token code with a set of a password and an additional code included in the user authentication request.

12. A product comprising a non-transitory computer-readable medium storing a program for authenticating, by an authentication system, a user who uses a usage target system,
wherein, the program being executed under control of a processor of an information communication terminal causes the information communication terminal to perform to:
store a password derivation pattern constituted by specific elements selected from a plurality of elements forming a geometric pattern;
transmit an authentication request prior notification to the authentication system;
obtain at least one token code that is in synchronization with at least one token code generated by the authentication system from a security token of the user;
generate a code table by assigning a first token code obtained to the specific elements forming the password derivation pattern within the geometric pattern, and assigning an arbitrary code to remaining elements of the geometric pattern;
generate an additional code based on a second token code obtained;
display a reference screen on a user interface; and
in a communicative condition, display the reference screen on the user interface so as to include the code table generated, and transmit the authentication request prior notification to the authentication system, so that if an authentication server of the authentication system receives the authentication request prior notification from the information communication terminal being in the communicative condition, before receiving the authentication request, the authentication server performs an authentication determination on the authentication request based on comparison of the first token code generated by a synchronization server of the authentication system with a password included in the authentication request, and if the authentication server receives the authentication request without receiving the authentication request prior notification, the authentication server performs the authentication determination on the authentication request based on comparison of a set of at least the first token code and the second token code generated by the synchronization server with a set of a password and an additional code included in the authentication request, and in a non-communicative condition, display the reference screen on the user interface so as to include the code table generated and the additional code generated.

13. The authentication system according to claim 10, wherein the authentication server transmits the authentication history information to the second usage target system.

* * * * *